US012217311B2

(12) United States Patent
Groom

(10) Patent No.: US 12,217,311 B2
(45) Date of Patent: *Feb. 4, 2025

(54) DYNAMICALLY GENERATED OBJECT-RESPONSIVE INTERACTIVE ACTION DISPLAY

(71) Applicant: John F. Groom, Manassas, VA (US)

(72) Inventor: John F. Groom, Manassas, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/819,590

(22) Filed: Aug. 12, 2022

(65) Prior Publication Data

US 2023/0105485 A1 Apr. 6, 2023

Related U.S. Application Data

(63) Continuation of application No. 16/947,455, filed on Aug. 3, 2020, now Pat. No. 11,475,526.

(Continued)

(51) Int. Cl.
*G06Q 40/08* (2012.01)
*G06F 3/04815* (2022.01)
(Continued)

(52) U.S. Cl.
CPC ......... *G06Q 40/08* (2013.01); *G06F 3/04815* (2013.01); *G06F 3/0484* (2013.01);
(Continued)

(58) Field of Classification Search
CPC .................................................... G06Q 40/08
See application file for complete search history.

(56) References Cited

U.S. PATENT DOCUMENTS 6,915,310 B2 * 7/2005 Gutierrez ............... G06F 16/29
707/921
7,277,572 B2 * 10/2007 MacInnes ............ G06Q 10/103
382/284

(Continued)

FOREIGN PATENT DOCUMENTS

CN 105023201 B 4/2017
CN 106595565 B 5/2019

OTHER PUBLICATIONS

Building 360-Degree Information Applications Redbooks (Year: 2014).*

(Continued)

*Primary Examiner* — Bruce I Ebersman
(74) *Attorney, Agent, or Firm* — Thompson Patent Law Offices

(57) ABSTRACT

Apparatus and associated methods related to generate at least one quotation request from records related to tangible property. In an illustrative embodiment, a signal corresponding to input from a user identifying a real environment is received. For example, the user may transmit a quotation request associated with the real environment. Based on the quotation request, for example, identify information related to the real environment based on predetermined requirements associated with at least one API related to a type of the request. For example, at least one second quotation request may be generated as a function of the information to a plurality of vendors through the at least one API. Various embodiments may perform virtual environment operations to present a plurality of records related to the real environment.

18 Claims, 16 Drawing Sheets

Related U.S. Application Data

(60) Provisional application No. 62/882,125, filed on Aug. 2, 2019.

(51) Int. Cl.
*G06F 3/0484* (2022.01)
*G06F 9/54* (2006.01)
*G06F 16/23* (2019.01)
*G06F 16/245* (2019.01)
*G06Q 10/10* (2023.01)
*G06Q 30/012* (2023.01)
*G06Q 30/0645* (2023.01)

(52) U.S. Cl.
CPC .......... *G06F 9/541* (2013.01); *G06F 16/2379* (2019.01); *G06F 16/245* (2019.01); *G06Q 10/10* (2013.01); *G06Q 30/012* (2013.01); *G06Q 30/0645* (2013.01)

(56) References Cited

U.S. PATENT DOCUMENTS

| | | | |
|---|---|---|---|
| 7,516,103 B1 * | 4/2009 | Peitrucha, Jr. | G06Q 30/02 705/56 |
| 8,041,636 B1 * | 10/2011 | Hunter | G06Q 40/06 705/40 |
| 8,219,558 B1 * | 7/2012 | Trandal | G06Q 50/16 707/736 |
| 8,229,861 B1 * | 7/2012 | Trandal | G06Q 40/08 705/26.1 |
| 8,340,983 B2 * | 12/2012 | Grover | G06Q 40/00 705/35 |
| 8,523,067 B2 * | 9/2013 | Stone | G06Q 30/0631 705/26.61 |
| 8,525,827 B2 * | 9/2013 | Boersma | G06T 15/00 715/848 |
| 8,587,613 B2 * | 11/2013 | Wang | G06V 30/40 715/251 |
| 8,635,104 B2 * | 1/2014 | Adams | G06Q 30/02 705/316 |
| 8,830,267 B2 * | 9/2014 | Brackney | G06Q 10/06 345/632 |
| 8,861,840 B2 | 10/2014 | Bell et al. | |
| 8,861,841 B2 | 10/2014 | Bell et al. | |
| 8,879,828 B2 | 11/2014 | Bell et al. | |
| 9,165,410 B1 | 10/2015 | Bell et al. | |
| 9,171,405 B1 * | 10/2015 | Bell | H04N 13/271 |
| 9,324,190 B2 | 4/2016 | Bell et al. | |
| 9,396,586 B2 | 7/2016 | Bell et al. | |
| 9,443,276 B2 * | 9/2016 | Barry, III | G16H 40/20 |
| 9,489,775 B1 | 11/2016 | Bell et al. | |
| 9,589,202 B1 * | 3/2017 | Wilbert | G06V 20/62 |
| 9,760,994 B1 | 9/2017 | Bell et al. | |
| 9,786,097 B2 | 10/2017 | Bell et al. | |
| 9,817,922 B2 * | 11/2017 | Glunz | G06T 17/00 |
| 9,953,111 B2 | 4/2018 | Bell et al. | |
| 10,026,224 B2 | 7/2018 | Bell et al. | |
| 10,030,979 B2 | 7/2018 | Bjorke et al. | |
| 10,055,876 B2 | 8/2018 | Ford et al. | |
| 10,102,639 B2 | 10/2018 | Bell et al. | |
| 10,102,657 B2 * | 10/2018 | Huang | G06F 3/1454 |
| 10,127,722 B2 | 11/2018 | Shakib et al. | |
| 10,139,985 B2 | 11/2018 | Mildrew et al. | |
| 10,163,261 B2 | 12/2018 | Bell et al. | |
| 10,210,577 B1 * | 2/2019 | Davis | G06Q 10/087 |
| 10,304,240 B2 | 5/2019 | Bell et al. | |
| 10,325,399 B2 | 6/2019 | Ford et al. | |
| 10,482,679 B2 | 11/2019 | Bell et al. | |
| 10,528,962 B2 * | 1/2020 | Rattner | G06Q 30/0283 |
| 10,529,141 B2 | 1/2020 | Bell et al. | |
| 10,529,142 B2 | 1/2020 | Bell et al. | |
| 10,529,143 B2 | 1/2020 | Bell et al. | |
| 10,534,962 B2 | 1/2020 | Hovden et al. | |
| 10,540,054 B2 | 1/2020 | Hovden et al. | |
| 10,586,386 B2 | 3/2020 | Bell et al. | |
| 10,650,106 B2 | 5/2020 | Bell et al. | |
| 10,655,969 B2 | 5/2020 | Bjorke et al. | |
| 10,657,573 B2 * | 5/2020 | Cohen | G06T 3/02 |
| 10,666,929 B2 | 5/2020 | Bradski et al. | |
| 10,679,292 B1 * | 6/2020 | Call | G16Y 10/50 |
| 10,706,615 B2 | 7/2020 | Ford et al. | |
| 10,775,959 B2 | 9/2020 | Mildrew et al. | |
| 10,803,208 B2 | 10/2020 | Bell et al. | |
| 10,848,731 B2 | 11/2020 | Simek et al. | |
| 10,867,328 B2 * | 12/2020 | Rattner | G06Q 30/0611 |
| 10,909,758 B2 | 2/2021 | Bell et al. | |
| 10,909,770 B2 | 2/2021 | Bell et al. | |
| 10,936,176 B1 * | 3/2021 | Clark | G06Q 40/08 |
| 10,959,090 B1 * | 3/2021 | Paiz | H04L 63/04 |
| 10,984,244 B2 | 4/2021 | Hovden et al. | |
| 10,989,816 B2 | 4/2021 | Hovden et al. | |
| 10,997,448 B2 | 5/2021 | Bradski et al. | |
| 11,004,203 B2 | 5/2021 | Bradski | |
| 11,049,063 B2 | 6/2021 | Ali et al. | |
| 11,062,509 B2 | 7/2021 | Bell et al. | |
| 11,069,117 B2 | 7/2021 | Ford et al. | |
| 11,080,861 B2 | 8/2021 | Bradski et al. | |
| 11,080,884 B2 | 8/2021 | Bradski et al. | |
| 11,094,042 B1 | 8/2021 | Palmer | |
| 11,094,117 B2 | 8/2021 | Bell et al. | |
| 11,094,135 B1 * | 8/2021 | Palmer | G06T 7/50 |
| 11,094,137 B2 | 8/2021 | Gausebeck et al. | |
| 11,164,394 B2 | 11/2021 | Gausebeck | |
| 11,189,031 B2 | 11/2021 | Bradski et al. | |
| 11,263,460 B1 | 3/2022 | Rattner et al. | |
| 11,263,823 B2 | 3/2022 | Gausebeck et al. | |
| 11,270,363 B2 | 3/2022 | Rattner et al. | |
| 11,282,268 B1 | 3/2022 | Palmer | |
| 11,282,287 B2 | 3/2022 | Gausebeck | |
| 11,334,901 B2 | 5/2022 | Rattner et al. | |
| 11,379,992 B2 | 7/2022 | Bradski et al. | |
| 11,422,671 B2 | 8/2022 | Mildrew et al. | |
| 11,494,857 B2 | 11/2022 | Winans | |
| 11,507,713 B2 * | 11/2022 | Tran | G06F 30/13 |
| 11,521,273 B2 * | 12/2022 | Jakka | G06Q 30/0205 |
| 11,551,410 B2 | 1/2023 | Bell et al. | |
| 2002/0091991 A1 * | 7/2002 | Castro | G06F 9/06 717/106 |
| 2004/0006566 A1 * | 1/2004 | Taylor | G06Q 10/10 |
| 2006/0184379 A1 * | 8/2006 | Tan | G06Q 10/10 705/302 |
| 2007/0260495 A1 * | 11/2007 | Mace | G06Q 10/02 709/201 |
| 2009/0024420 A1 * | 1/2009 | Winkler | G06Q 40/08 705/4 |
| 2010/0046553 A1 * | 2/2010 | Daigle | G06F 21/35 370/474 |
| 2010/0066733 A1 * | 3/2010 | Kulkarni | H04L 41/22 345/419 |
| 2010/0299217 A1 * | 11/2010 | Hui | G06Q 30/012 705/16 |
| 2011/0244798 A1 * | 10/2011 | Daigle | H04L 63/0853 455/41.2 |
| 2011/0270773 A1 * | 11/2011 | Siekman | G06Q 50/16 705/305 |
| 2013/0073336 A1 * | 3/2013 | Heath | G06Q 30/02 705/7.29 |
| 2013/0073387 A1 * | 3/2013 | Heath | G06Q 30/02 705/14.53 |
| 2013/0073388 A1 * | 3/2013 | Heath | G06Q 50/01 705/14.53 |
| 2013/0290033 A1 * | 10/2013 | Reeser | G06Q 40/08 705/4 |
| 2013/0317942 A1 * | 11/2013 | Cullen, III | G06Q 30/0601 705/26.35 |
| 2014/0043436 A1 | 2/2014 | Bell et al. | |
| 2014/0044344 A1 | 2/2014 | Bell et al. | |
| 2014/0125658 A1 | 5/2014 | Bell et al. | |
| 2014/0125768 A1 | 5/2014 | Bell et al. | |
| 2014/0125769 A1 | 5/2014 | Bell et al. | |
| 2014/0125770 A1 | 5/2014 | Bell et al. | |

(56) References Cited

U.S. PATENT DOCUMENTS

| | | | |
|---|---|---|---|
| 2014/0136242 A1* | 5/2014 | Weekes | G06Q 40/08 705/4 |
| 2014/0222469 A1* | 8/2014 | Stahl | G06Q 40/08 705/4 |
| 2014/0278582 A1* | 9/2014 | Shambach | G06Q 40/08 705/4 |
| 2015/0187108 A1* | 7/2015 | Mullins | G06T 11/60 345/633 |
| 2015/0262421 A1 | 9/2015 | Bell et al. | |
| 2015/0269785 A1 | 9/2015 | Bell et al. | |
| 2015/0310497 A1* | 10/2015 | Valin | H04L 51/08 705/14.66 |
| 2016/0086295 A1* | 3/2016 | Cohen | G06Q 50/165 705/315 |
| 2016/0125274 A1 | 5/2016 | Zhou et al. | |
| 2016/0217157 A1* | 7/2016 | Shih | G06F 16/5854 |
| 2017/0032466 A1* | 2/2017 | Feldman | G06Q 50/16 |
| 2017/0293950 A1* | 10/2017 | Rathod | G06Q 30/0283 |
| 2018/0075168 A1* | 3/2018 | Tiwari | H04N 23/698 |
| 2018/0137201 A1* | 5/2018 | Longbin | G06V 20/41 |
| 2019/0197599 A1* | 6/2019 | Zia | G06Q 30/0631 |
| 2019/0244267 A1* | 8/2019 | Rattner | G06N 20/00 |
| 2019/0251645 A1* | 8/2019 | Winans | G06V 20/64 |
| 2019/0339687 A1* | 11/2019 | Cella | G06Q 30/02 |
| 2019/0340824 A1* | 11/2019 | Shaviv | G06T 19/20 |
| 2020/0126288 A1* | 4/2020 | Huang | G06T 19/006 |
| 2020/0151749 A1* | 5/2020 | Rattner | G06Q 30/0611 |
| 2020/0364482 A1 | 11/2020 | Bradski et al. | |
| 2020/0364521 A1 | 11/2020 | Bradski et al. | |
| 2020/0364871 A1 | 11/2020 | Bradski | |
| 2020/0364873 A1 | 11/2020 | Bradski et al. | |
| 2020/0364877 A1 | 11/2020 | Bradski et al. | |
| 2020/0364878 A1 | 11/2020 | Bradski et al. | |
| 2020/0364895 A1 | 11/2020 | Bradski et al. | |
| 2020/0364900 A1 | 11/2020 | Bradski et al. | |
| 2020/0364913 A1 | 11/2020 | Bradski | |
| 2020/0388072 A1 | 12/2020 | Bell et al. | |
| 2021/0264609 A1 | 8/2021 | Bradski | |
| 2021/0335034 A1 | 10/2021 | Bell et al. | |
| 2021/0374410 A1 | 12/2021 | Hovden et al. | |
| 2021/0375047 A1 | 12/2021 | Bell et al. | |
| 2022/0058414 A1 | 2/2022 | Bradski et al. | |
| 2022/0075080 A1 | 3/2022 | Hovden et al. | |
| 2022/0198562 A1* | 6/2022 | Cella | G06Q 40/04 |
| 2022/0207849 A1 | 6/2022 | Gausebeck | |
| 2022/0317307 A1 | 10/2022 | Gausebeck et al. | |
| 2022/0334262 A1 | 10/2022 | Gausebeck et al. | |

OTHER PUBLICATIONS

Second Life Gift Registry: Bringing Retail Web Applications into the Metaverse 2008 (Year: 2008).*

Bridging semantics with physical objects using augmented reality, IEEE (Year: 2015).*

Designing Buildings Td. Asset Information. Bim Wiki. 43909. https://www.designingbuildings.co.uk/wiki/Asset_information.

Lievendag, Nick. Preview: 3D Room Scanning With Canvas & Structure Sensor. 3D Scan Expert. 42684 https://3dscanexpert.com/canvas-3d-room-scanning-structure-sensor/.

Moilanen, Pekka. Bim: Modernizing Building Lifecycle Management. Vertex Bd Software. 43719. https://vertexcad.com/bd/2019/09/11/bim-modernizing-building-lifecycle-management/.

Paul, Shimonti. What Is Bim-Bim (Building Information Modeling) Is An Intelligent 3D Model-Based Process. Geospatial World. 43146. https://www.geospatialworld.net/blogs/what-is-bim/.

Puybaret. Sweet Home 3D. Sourceforge. https://sourceforge.net/projects/sweethome3d/.

Sankar, Aditya; Seitz, Steve M .. Interactive Room Capture On 3D-Aware Mobile Devices. Proceedings Of The 30th Annual ACM Symposium On User Interface Software And Technology. 415-426. 43028. ACM (Quebec City QC Canada). https://dl.acm.org/doi/10.1145/3126594.3126629.

* cited by examiner

DYNAMICALLY GENERATED OBJECT-RESPONSIVE INTERACTIVE ACTION DISPLAY

CROSS-REFERENCE TO RELATED APPLICATIONS

This application is a continuation and claims the benefit of U.S. application Ser. No. 16/947,455, titled "MULTI-DIMENSIONAL INTERACTION WITH DATA STORES RELATED TO TANGIBLE PROPERTY," filed by John F. Groom on Aug. 3, 2020, which claims benefit of U.S. Provisional Application Ser. No. 62/882,125, "MULTI-DIMENSIONAL INTERACTION WITH DATA STORES RELATED TO TANGIBLE PROPERTY," filed Aug. 2, 2019 by John F. Groom.

This application incorporates the entire contents of the foregoing application(s) herein by reference.

TECHNICAL FIELD

This invention is in the field of interacting with data stores. In particular, it relates to apparatus and methods of interacting with data stores related to tangible property.

BACKGROUND

Various methods and apparatus have been provided for managing information related to various forms of physical property, and tasks associated therewith. Receipt capture, CAD models, 3D walkthroughs, product shopping, and various other inventions provide data stores offering or receiving information related to some narrow aspect of a user's physical property, or potential physical property, and tasks related thereto.

SUMMARY

Apparatus and associated methods related to interacting with multi-dimensional data stores related to tangible objects (TOs) in real environments (REs) through associated representative objects (ROs) in representative maps (RMs). In an illustrative embodiment, one or more RM is generated representing one or more corresponding RE, and one or more TO is identified in the RE and associated with one or more corresponding RO in the RM(s). Various information, located across multi-dimensional data stores, related to the TOs and REs may be linked to one or more ROs and RMs such that the user may access the information through the ROs and RMs.

Various embodiments may achieve one or more advantages. For example, some embodiments may be directed to systems and methods that advantageously perform operations such that a user efficiently and intuitively accesses and interacts with TO and RE related information. Some embodiments may be directed to generating interfaces that advantageously receive input from a user to access and interact with TO and RE related information across multi-dimensional data stores. Some embodiments may be directed to advantageously identifying TOs in media streams of REs. Some embodiments may be directed to advantageously generating and submitting requests for quotation related to TOs and REs, to advantageously comparing quotes received in response to requests for quotation, or both. Some embodiments may be directed to advantageously managing tasks related to TOs and REs.

BRIEF DESCRIPTION OF THE DRAWINGS

Various embodiments of the present embodiments are described with reference to the following FIGURES. Like reference numerals therein refer to like parts throughout the various views unless otherwise specified. Embodiments and portions of embodiments illustrated and described herein are non-limiting and non-exhaustive.

DETAILED DESCRIPTION OF ILLUSTRATIVE EMBODIMENTS

The following description of various embodiments of the invention, combined with the associated drawings, enables persons of ordinary skill in the art to both practice the preferred embodiments of the invention, and to understand related applications and embodiments of the invention that may not be specifically set forth, but are encompassed by the specification and claims.

To aid understanding, this document is organized as follows. First, illustrative use cases and exemplary user interfaces are discussed with reference to FIGS. 1-5. Then, with reference to FIGS. 6-15, the discussion turns to exemplary methods of identifying, generating, and interacting with representative objects.

Figure 1:
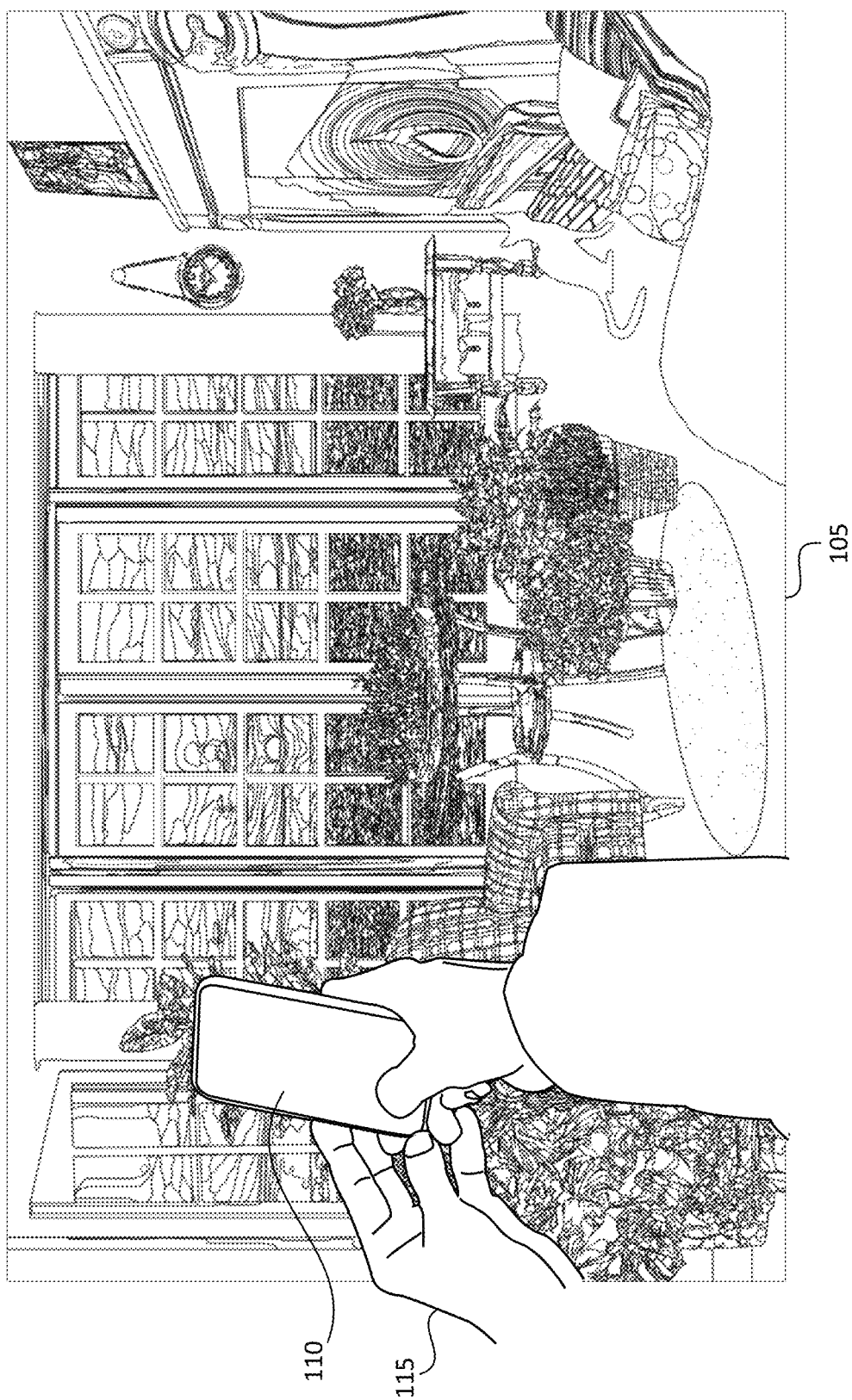
FIG. 1 depicts an illustrative use case of an embodiment during generation of a representative map of a real environment.

FIG. 1 depicts an illustrative use case of an embodiment during generation of a representative map (RM) of a real environment (RE). A user 115 holds a media capture device 110, and captures a media stream of a RE 105. The media capture device may be, by way of illustration and not limitation, a smartphone, tablet, camera, 3D camera, or video camera. A media capture device may be provided with instructions (e.g. an app on a smartphone) for processing the media stream, communicating the media stream to a remote processing system, or some combination thereof. A media capture device may be advantageously linked with a processing or transmission device, such as a 3D camera connected by wiring, Bluetooth, or infrared to a smartphone or laptop, a smartphone connected by cellular communication to a remote server(s), or other appropriate communication linking providing a media capture device and processing of the resultant media stream. Accordingly, a user may capture a media stream of a RE, and generate a RM therefrom with which the user may interact through representative objects (ROs) to manage various tasks related to the RE and tangible objects (TOs) therein. A RO in a RM may represent a corresponding TO in the RE represented by the RM. Accordingly an RM(s) and RO(s) may advantageously facilitate more intuitive and more efficient user interaction with multiple data stores, or multiple dimensions within one or more data stores related to an associated RE(s) and TO(s). The data stores may, by way of example and not limitation, be local data stores, remote data stores, data stores accessed through one or more application programming interface (API), or some combination thereof. A data store may have multiple dimensions, for example, having multiple tables of linked information. Multiple data stores may contain multi-dimensional information by virtue of desired or required information being stored and linked, directly, or indirectly, across disparate data stores, potentially managed by different entities.

The user may, for example, create a RM of their house using an app on a smartphone. For example, the user may begin with a room, such as a sitting room. The user may begin by initiating capture of a media stream of the room by, for example, moving the smartphone in a circle to capture a 360 degree view of the room. As the user begins capturing a media stream, the app may begin transmitting the media stream to, for example, a cloud server(s) running a system of program instructions configured to receive and process the media stream. The media stream may be made up of multiple individual images, and the system may process the individual images in the same order as they were captured by the user. The system may identify the first image received as representing a starting point, and the last image received from the user in reference to a first room as an ending point of the media stream which should, for example, be an image of the same physical location as the starting point. The system may identify each image with a pointer indicating the orientation of the picture, for example, in reference to the starting point.

The system may analyze the media stream images and create therefrom a panorama of the room. The system may calculate the combined width of the images making up the media stream and assume that the height is the same for all the images. The system may identify shared objects between images and overlap the images accordingly in creating the panorama and calculating the combined width. The user may specify a height represented by the images or a portion thereof. The system may then produce a representative map of the room which may, for example, be a 3D panorama. The system may transmit the RM to a user's device via, for example, a web page, program interface, or app interface. The user may then interact with the RM and place, identify, or interact with ROs therein which represent tangible objects TOs in the RE.

In interacting with an RM, the images from the media stream may be arranged 'side by side' and combined, for example, in a panorama as discussed above. In doing so, one or more controllers running a system of program instructions may, for example, generate a viewpoint(s). A viewpoint may identify the direction of the RM relative to a beginning direction of the RM. The beginning direction of the RM may, for example, be defined as an orientation of the beginning point image. The system may set the starting point in 3D coordinates (x,y,z) as (0,0,0).

The RM may be displayed in an interface which allows certain user interactions to manipulate a present display of the RM. For example, the user may move a current orientation of the RM display by rotating the screen on which the RM is displayed (e.g., a smartphone or tablet), or by using touch, gestures, or directional input (e.g., a mouse, trackball, or gesture transducer) to rotate the a current orientation of the RM as displayed to the user. When a command for rotation, for example, of the RM display is received, the system may calculate the scroll length and move the images to create a 3D rotation effect.

Figure 2A:
FIG. 2A depicts an illustrative use case of an embodiment in reference to identifying and interacting with representative objects of tangible objects in a representative map of a real environment.

FIG. 2A depicts an illustrative use case of an embodiment in reference to identifying and interacting with representative objects of tangible objects in a representative map of a real environment. A RM 205, which may, for example, represent RE 105, may include one or more ROs representing associated TOs within the RE. For example, window RO 206 may be a RO of actual windows in the RO (e.g., a sitting room of the user). A user may click, tap, or otherwise select the RO in the RM 205, and display information associated therewith. Information box 210 depicts an illustrative display which may be presented to a user in an interface when the user clicks on window RO 206. Similarly, when a user selects painting RO 206, the user may be presented with information box 220.

In various embodiments, the user may be presented with various information, which may depend on the RE, on the individual TO, on a user's predetermined preferences, on the taxonomy of TO (e.g., classification or tagging of the TO), on the context in which the user is interacting (e.g., in a 'quotes' mode, an 'insurance' mode, a 'shopping' mode, a 'maintenance' mode, a 'general' mode, or other appropriate mode related to interacting with TOs in a RE), or some combination thereof. For example, information boxes 210 and 220 may represent information presented to a user interaction with the RM in a 'general' mode.

Information box 210 depicts illustrative information and options which may be presented to the user, beginning with an identify title of the associated RO, "PICTURE WINDOWS." The user is further presented with taxonomic information in the form of a 'breadcrumb trail,' which may identify to the user the context of the associated TO in the immediate RE and broader REs which may be associated therewith, indicating that the "PICTURE WINDOWS" are in the "LIVING ROOM" which itself is located in the "HOME." Some or all of the elements of the breadcrumb trail may be linked to allow a user to directly access the associated RM.

The user is further presented in this illustrative example with general information regarding the TO, including size of the windows, manufacturer, model, and installation date. The information may be, for example, collected by querying the user, by receiving the information from the builder (e.g., directly inputted, provided in a standardized file format, or exported from a building information management (BIM) tool or computer aided design (CAD) model), through scanning a code (e.g., a QR code or barcode) containing the information or providing access thereto, querying one or more API with identifying information, optical character recognition (OCR) and automatic parsing of documents (e.g., a receipt, invoice, buildsheet, specification sheet, or blueprints). Various details (such as in this example the underlined terms) may provide a user direct access to various records in data stores. For example, "Anderson" may provide a user a link to the manufacturer web site, to a list of all of the user's TOs manufactured by Anderson, or to a third party interface displaying Anderson products. "SuperE-Plus Platinum" may provide a user access to a description of the window model chosen.

The user is further presented in this illustrative example with further information and access to various other records in data stores. The paint color last recorded as used on the windows (interior and exterior) is presented, with direct access to the paint color. The user may be presented with a hexcode of the color detected by image analysis of images taken of the TO by the user, and may further be presented with matching colors available from paint manufacturers. The user may be presented with a description of the paint recorded as used on the windows. The paint may be recorded, for example, automatically when an invoice for painting was processed or when a user indicated a portion of the house was painted which would include the windows, manually by a user when the TO was identified and added as a RO to the RM, or subsequently. The user is presented with access to a record of the warranty document of the windows, the purchase receipt (or associated transaction record) for the windows, and the manufacturer care guide. These documents may individually or collectively be stored, for example, on a manufacturer's website, with an independent document storage service (which may be accessed through an API), in a data store associated with another application, in financial records (e.g., of connected bank accounts), in a local data store, or on a remote or distributed data store of the user (e.g., a network attached storage (NAS)). These documents may have been manually associated with the RO by a user, may have been automatically associated with the RO by term recognition by one or more local or remote controllers, and may have been identified by accessing one or more API (e.g., querying manufacturer or document aggregation service APIs for warranty and manufacturer care guide information, or querying bank APIs, vendor APIs, and document storage service APIs for associated transactions). The user is also presented with access to further "Information," which may be additional information stored on one or more data stores and associated with the RO, or may be dynamically associated information chosen according to a current context of the RO.

In this illustrative example, the user is further presented with dynamic access to third party data stores through, for example, queries or redirection to search or aggregation APIs. Illustrative examples presented are "similar windows online," which may present results from one or more APIs (e.g., manufacturer or retailer APIs) of windows that would replace the current TO (e.g., by dimensions) and "shop window treatments," which may present results from one or more APIs from window treatment manufacturers or retailers according to, for example, characteristics of the windows (e.g., dimensions), color of the windows and room, style of the room, and characteristics of other TOs in the room. The user is further presented in this example with "Browse suggested window treatments," which may present the user with images of window treatments suggested according to characteristics, for example, of the window, room, other TOs in the vicinity, and the house. Further, the system may be configured to allow a user to 'try' a selected suggested window treatment by generating and placing a RO for the suggested window treatment in the RM, thereby allowing the user to visualize the potential TO (suggested window treatment) in the RE (on the windows in the room).

In this illustrative example, the system is further configured to allow a user to manipulate information from various data stores and transmit the information, or data generated therefrom, to other systems and data stores. An illustrative example presented is "Request glass replacement quotes," which may retrieve various information related to the TO (e.g., dimensions, window type, frame material, and efficiency rating) and generate queries therefrom to submit to one or more vendors. The vendors may be predetermined or dynamically determined at the time of the request. The vendors may be automatically contacted, or presented to a user (e.g., in a tabular format) to select or deselect. The queries may be submitted through one or more APIs, which may be directly maintained by the vendor or may be provided by one or more quotation or centralized vendor contact services, may be generated as an electronic file format suitable for printing and mailing or hand-delivering, e-mailing, submitting online or through a messaging service. Another illustrative example presented is "File homeowners insurance claim," which may initiate operations retrieving various information relating to the RE, the TO, and the user, and may generate a request therefrom. For example, the system may retrieve information identifying a homeowner's policy (e.g., by querying the user, or by accessing one or more data stores previously identified as having relevant information, such as when a user uploaded the homeowner's policy, purchased the policy using the system, or associated an insurer's record with the home), retrieve information relating to the TO, and retrieve information relating to the damage for which a claim is being made (e.g., by requesting a description and date from the user and receiving images relating to the damage from the user). Further operations may include assembling the information into a claim form (e.g., to be printed off or saved, and sent by the user to the insurance company) or by generating a claim request and transmitting it through one or more API to the insurance company (e.g., through the insurance company's API, or through a third-party service which may receive the request and transmit it to the insurance company or to an entity to process it on their behalf).

Information box 220 further depicts illustrative information and options which may be presented to the user, beginning with an identify title of the associated RO, "Amazing Painting." The user is further presented with the artist name and the date of the painting. The artist name may provide direct access to further information regarding the artist, for example it may cause operations to be performed to retrieve a list of other objects held by the user created by the artist, or to retrieve further information regarding the artist from one or more remote data stores (e.g., artist biography and other works by the artist). The information box further presents taxonomic information in the form of a 'breadcrumb trail,' which may identify to the user the context of the associated TO in the immediate RE and broader REs which may be associated therewith, indicating that the "Amazing Painting" is currently located in the "Living Room" which itself is located in the "Home." Some or all of the elements of the breadcrumb trail may be linked to allow a user to directly access the associated RM.

The user is further presented in this illustrative example with taxonomic information regarding the TO, which has been here classified as being "Art," a subcategory of "Decor," a subcategory of "Furnishings." The user is presented with direct access to each category which may, for example, be configured to initiate operations retrieving an inventory of items held by the user in each category. The taxonomy of the TO may advantageously be used in determining what information to seek to associate with the TO and to display to the user, as well as how to display the information to the user, as can be seen in this example. For example, "artist," and other painting related details are not relevant to a window, while "manufacturer and "glass replacement quotes" are relevant to the window and not to a piece of art. In various embodiments, the information to be associated with particular taxonomies may be predetermined by, for example, retrieving types of information for a taxonomy from a local or remote lookup table, from predetermined templates provided by a user or a third-party, or through machine learning algorithms which suggest related information according to past information associated with a taxonomy by one or more user. In some embodiments, the user may manually add information (e.g., custom fields) to some or all taxonomies, or to particular ROs. In some embodiments, a TO may be associated with multiple taxonomies.

The system is configured to further present the user in this illustrative example with other details specific to art pieces, including what type of media ("Canvas") and presentation ("Gallery-wrapped"), as well as more general information which is relative to art pieces, including purchase date, vendor, valuation, and insurance information. The "Purchased Aug. 1, 1995" may initiate operations to retrieve an image of a purchase receipt from a local or remote data store; the "The Galleria" may initiate operations to retrieve a list of inventory available from the vendor (e.g., by querying one or more vendor-specific or third-party API), or retrieve a list of TOs purchased by the user from the vendor. "Valued Mar. 24, 2008 at $750" may retrieve a digital copy of a valuation report from a data store. In some embodiments, the valuation report may have been uploaded by a user to the system, provided to the user by the valuator through the system, be stored in a non-associated data store and instructions (e.g., a universal resource indicator (URI), a file location, a pointer, saved query construction terms, or saved API and record identification information) for retrieving the digital copy or redirecting the user thereto associated with the TO. "Insured by Lloyd's of London" may initiate retrieval of information related to a special policy applicable to the TO, and "file claim" may initiate operations to generate a claim which may include retrieving previously associated information related to the user and TO (e.g., name, artist, size, identifying number related to the insurance policy, policy number, purchase receipt, policy number), and may also obtain, store, and transmit additional information from the user (e.g., claim details, date, and related images).

In this illustrative example, the system is further configured to present the user with dynamic access to third party data stores through, for example, queries or redirection to search or aggregation APIs. Illustrative examples presented are "explore similar art," which may initiate operations retrieving results from one or more APIs (e.g., manufacturer or retailer APIs, or "MyFavArt" by Attitude Media), or transmitting information regarding the TO (e.g., image, artist, year, and other identifying information) to an appropriate API (e.g., related to a media explorer or scrapbook system such as is disclosed in U.S. patent application Ser. No. 15/912,199, filed Mar. 5, 2018, and US patent publication number US 20180196807A1, published Jul. 12, 2018, the disclosures of which related thereto are expressly incorporated herein by reference). The system may be further configured, similarly as was discussed in relation to information box 210, to request quotations, including for framing of the art (which may be configured to be presented according to characteristics of the TO, e.g., the art being gallery-wrapped and not presently framed), for insurance quotes, for restoration quotes, and for valuation; and to "find matching décor," according, for example, to characteristics of the art including size, style, colors, as well as characteristics of the RE and associated TOs (e.g., a fireplace mantle, wall color, trim color, home style, and furnishing styles).

The system is further configured in this example to present the user with "Try other art from gallery," which may present the user with images of art from "The Galleria" (which may be retrieve, for example, through a vendor-specific or third-party API). Further, the system may be configured to allow a user to 'try' pieces of art presented by generating and placing a RO for user-selected art in the RM, thereby allowing the user to visualize the potential TO (art piece) in the RE (the living room, or elsewhere in the home, or in another RE, such as an office, guest house, or vacation home). Similarly, the system is configured to present the user the option to "Try this in another room" which may, for example, activate the RO for dragging into another room, or with a dialog box to tentatively move the RO to another room. The RO may be presented in the RM such that the user can visualize the TO in another location, and repeatedly reposition it, without the trouble of moving it multiple times, or unduly risking a potentially valuable TO by moving it multiple times. The system may be further configured to notify the user that the RO is tentatively moved, and to receive input from a user either canceling or confirming the move (e.g., a confirmation or cancellation button, or receiving an image of the TO in its present location, conducting image analysis to determine which RE is represented, and updating the RO to associate it with an appropriate RM).

Figure 2B:
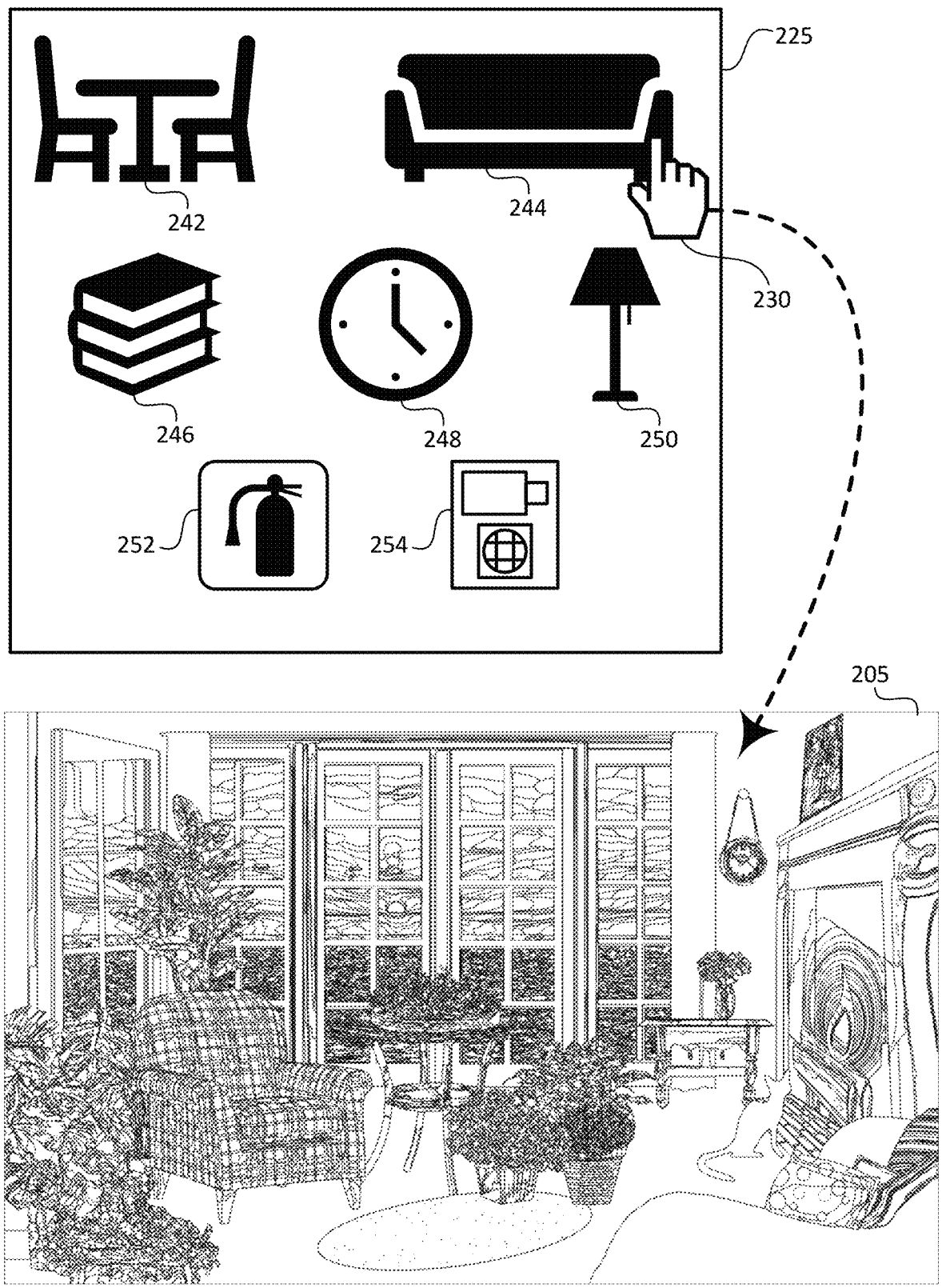
FIG. 2B depicts an illustrative use case of an embodiment in reference to adding representative objects of tangible objects to a representative map of a real environment.

FIG. 2B depicts an illustrative use case of an embodiment in reference to adding representative objects of tangible objects to a representative map of a real environment. For example, a system may be configured to allow a user to 'try' potential TOs in a selected RE by adding ROs to the RM. A user may be a homeowner, a builder, an interior designer, a friend, an architect, or other person desiring to visualize TOs in a RE before actually procuring or placing them. A selection interface 225 is presented to the user from which ROs can be selected and drug by user 230 into the RM 205 of the associated RE. The ROs may be retrieved, or generated from information retrieved from data stores including, by way of example and not limitation, of a user's inventory of TOs already associated with an RM by the system, of one or more manufacturer's or retailer's inventory, of a third-party shopping or home improvement service, or a community 'library' or 'store' of ROs. The ROs may be retrieved, or generated from information retrieved, through one or more APIs. For example, a user may select "living room furniture," and one or more APIs which may be appropriate be selected and appropriate API request(s) be accordingly generated and submitted. The APIs may be selected according to predetermined criteria stored on a user's device, or stored in a remote data store (e.g., in a cloud service associating particular types of requests—e.g., living room furnishings—with appropriate APIs—e.g. home improvement stores, furniture retailers, furniture manufacturers, and CAD libraries). The API request(s) may include related information received from the user (e.g., style or types of furnishing being searched for), or retrieved from a data store(s) related to the RE, user TO(s), or both. For example, the API request(s) may include house style, furnishing style, nearby furnishing colors, paint color, floor type and color, and other appropriate characteristics, to advantageously retrieve and present appropriate ROs to the user. In some embodiments, pre-generated ROs are retrieved from a data store(s) and placed directly into the RM. In some embodiments, information sufficient to create an RO is retrieved (e.g., an image and dimensions of the TO), or as much information as is available is retrieved and supplemented by information requested from the user or inferred by one or more inferring operations (e.g. machine learning or image analysis operations that determine TO size based off of image analysis of an image of the item in a setting, or machine learning applying dimensions or ratios deduced from similar TOs), and an RO generated therefrom.

In this illustrative example, a user is presented with icons in interface 225 which may represent a table and chair set 242, a sofa 244, a lamp 250, a clock 248, books 246, a fire extinguisher 252, and a video security system component 254, or may represent categories having items or subcategories or both. In the depicted embodiment, a user may wish to try a new sofa in the room, or may already have a sofa and wish to add it to the room. The system detects the user 230 dragging sofa 244 into RM 205, and may then generate an RO, scale the image according to the dimensions of the TO and the dimensions of the RE, and place the RO in the RM. The system may then, for example, generate one or more data store queries (which may be, for example, API requests) to retrieve further information regarding the RO (e.g., retrieve further details from the manufacturer or retailer, query financial records or messaging history of a user to locate transaction records), or request further information from the user (e.g., purchase receipt, warranty, actual images, and insurability). The system may be configured to initiate or suggest initiation of automatic information storage and retrieval associated with the TO such as, by way of example and not limitation, updating a home inventory list, updating financial records (e.g., recording a purchase), updating draft tax return documents (e.g., recording a deductible expense, recording a charitable deduction of a donated TO replaced by the new TO), requesting insurance quotations or requotation (e.g., updating personal property levels), extended warranty registration, scheduling (e.g., maintenance or cleaning).

Figure 3:
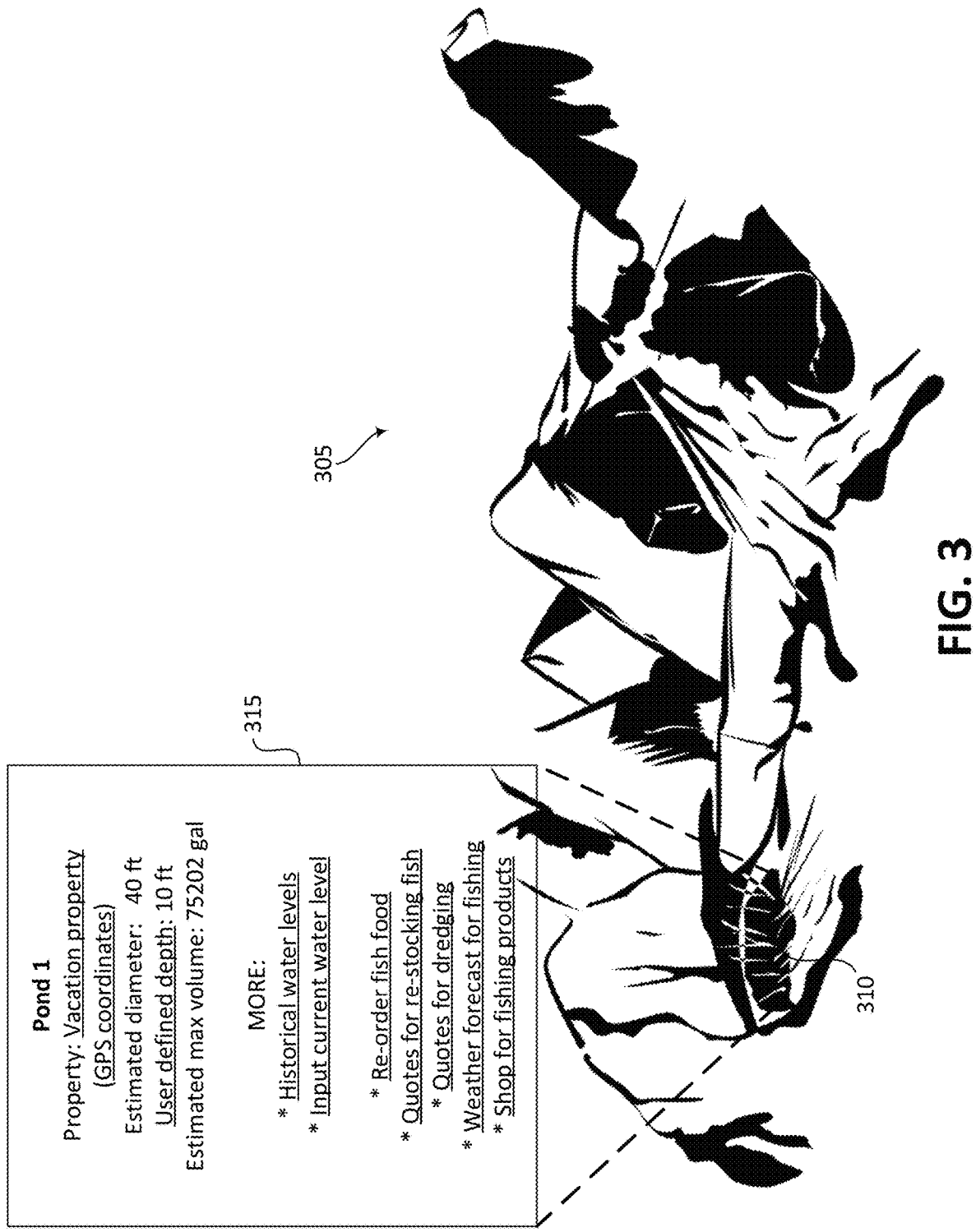
FIG. 3 depicts an illustrative use case of an embodiment in reference to identifying and interacting with representative objects in a representative map of tangible objects in a second real environment.

FIG. 3 depicts an illustrative use case of an embodiment in reference to identifying and interacting with representative objects in a representative map of tangible objects in a second real environment. RM 305 represents an outdoor real environment which is depicted in this illustrative example as a "Vacation property." The system is configured to present various information shown in information box 315 to a user when a RO 310 which may represent a pond on the property. The system may be further configured to access various data stores, which may include through one or more APIs, when the user initiates various commands such as are presented in information box 315.

Figure 4:
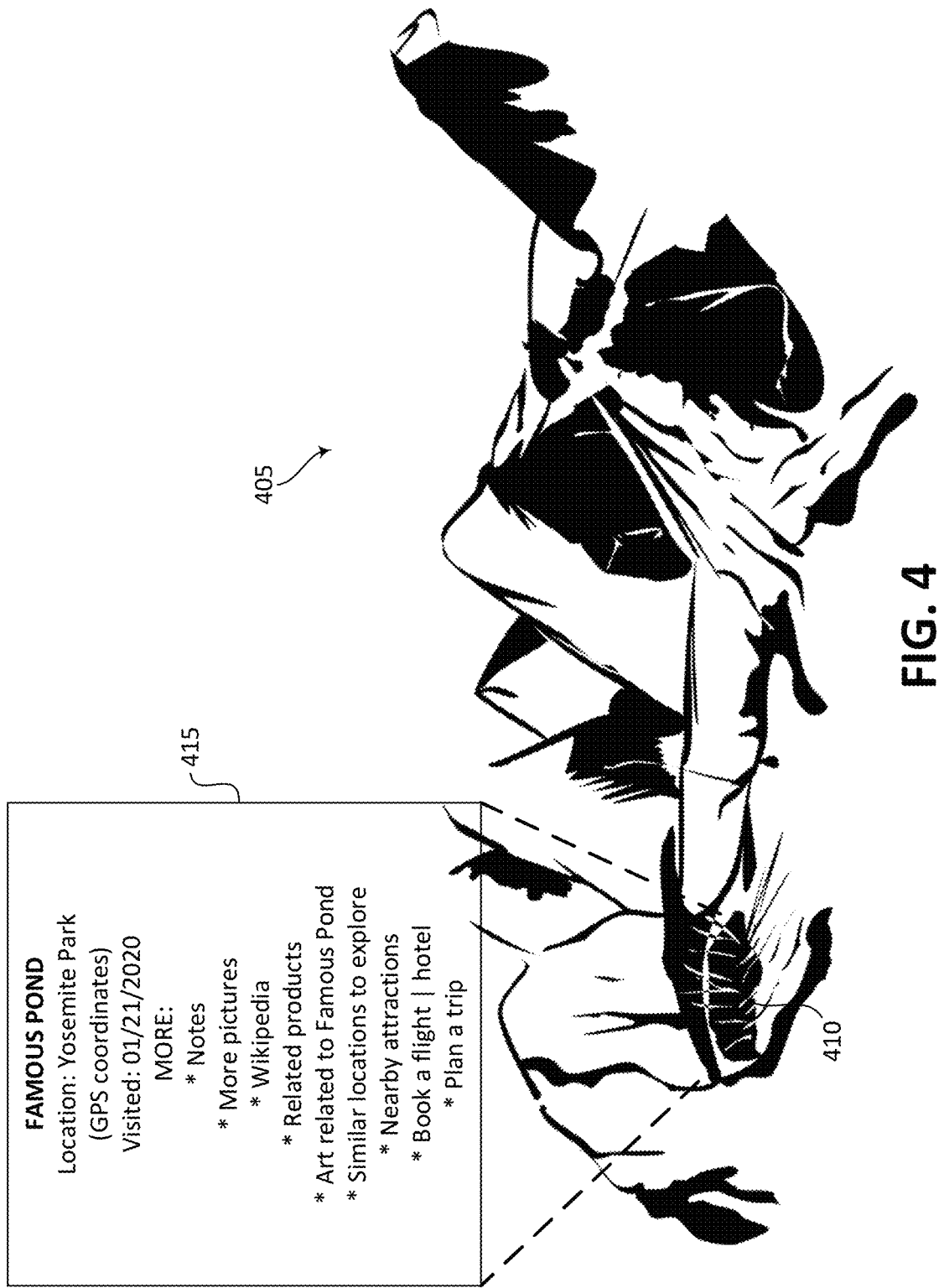
FIG. 4 depicts an illustrative use case of an embodiment in reference to identifying and interacting with representative objects in a representative map of tangible objects in a third real environment.

FIG. 4 depicts an illustrative use case of an embodiment in reference to identifying and interacting with representative objects in a representative map of tangible objects in a third real environment. RM 405 represents an outdoor real environment which is depicted in this illustrative example as "Yosemite Park." A property owner or manager may, for example, provide a publicly accessible RM 405 having TOs identified therein by ROs, such as "FAMOUS POND" identified by RO 410. A system may be configured to provide a publicly accessible interface where a user who wishes to 'virtually visit,' or an actual visitor who wishes more information, may explore the RM. A user, for example, may interact with RO 410 and the system retrieves information from one or more data stores and presents it in information box 415. The information box depicted in this example includes information on the TO, as well as options to initiate further data retrieval and manipulation, including retrieving and displaying "more pictures" (e.g., by querying one or more public or proprietary APIs), accessing "Wikipedia," retrieving a list of "related products" or "art related to Famous Pond" (which may, for example, be retrieved through one or more dynamically- or pre-determined APIs via queries constructed from information related to the TO and associated with the RO), "similar locations to explore" (e.g., retrieved from a travel service API according to a query generated using retrieved characteristics of the TO and RE associated with the RO and RM), and "nearby attractions," "book a flight hotel," and "plan a trip" (e.g., retrieved from a map API, travel service API, logistics service API, or hospitality service API partially using retrieved GPS coordinates stored in association with the RO)

Figure 5:
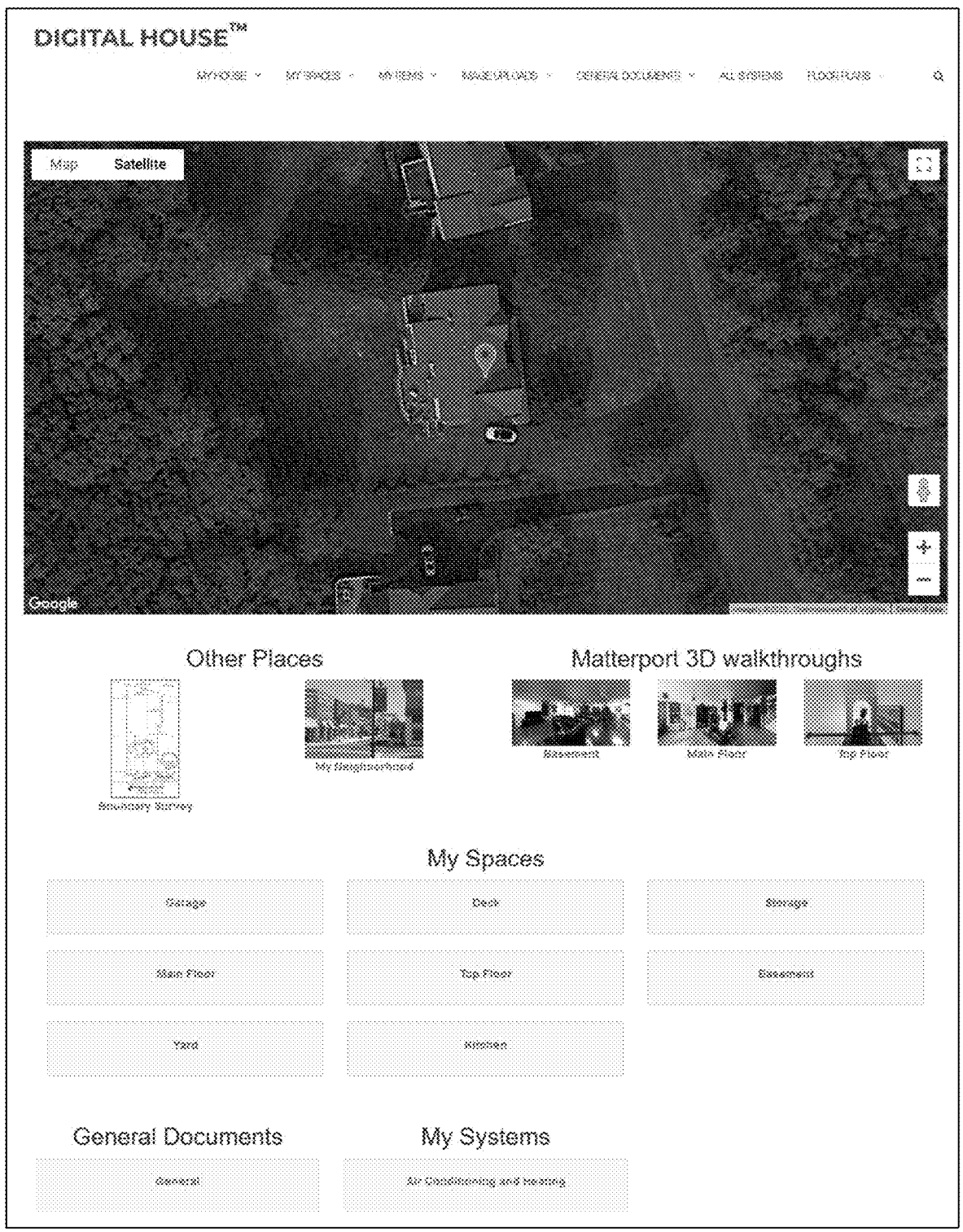
FIG. 5 depicts an exemplary interface presenting a representative map of a real environment.

FIG. 5 depicts an exemplary interface presenting a representative map of a real environment. For example, in some embodiments, a RM may be a 2D display of one or more REs, and may be presented in a taxonomical-based display instead of a geometric-based display, or as a combination thereof. In some embodiments, a system of one or more controllers running a set of program instructions may be configured to display an RE according to one or more specific REs therein (e.g., garage, deck, storage, main floor, and other appropriate REs within the home RE). The system may be configured to retrieve and display specific information associated with an RE, as depicted in this illustrative example, such as a map (e.g., retrieved through an API according to a location associated with the RE), a survey (e.g., stored in a homeowner's NAS or in a cloud storage, and retrieved therefrom according to a location associated with the RE), 3D walkthroughs (e.g., retrieved through a 3D walkthrough storage service API according to unique identifiers associated with one or more REs), document categories (e.g., stored in and retrievable from one or more data stores and associated with the RE or one or more REs or TOs within the RE), and systems of the RE such as "Air Conditioning and Heating" (which may, for example, initiate commands to retrieve ROs for one or more systems in the taxonomy and display them to the user, such as air conditioning unit(s), furnace(s), and hot water heater(s)).

Figure 6:
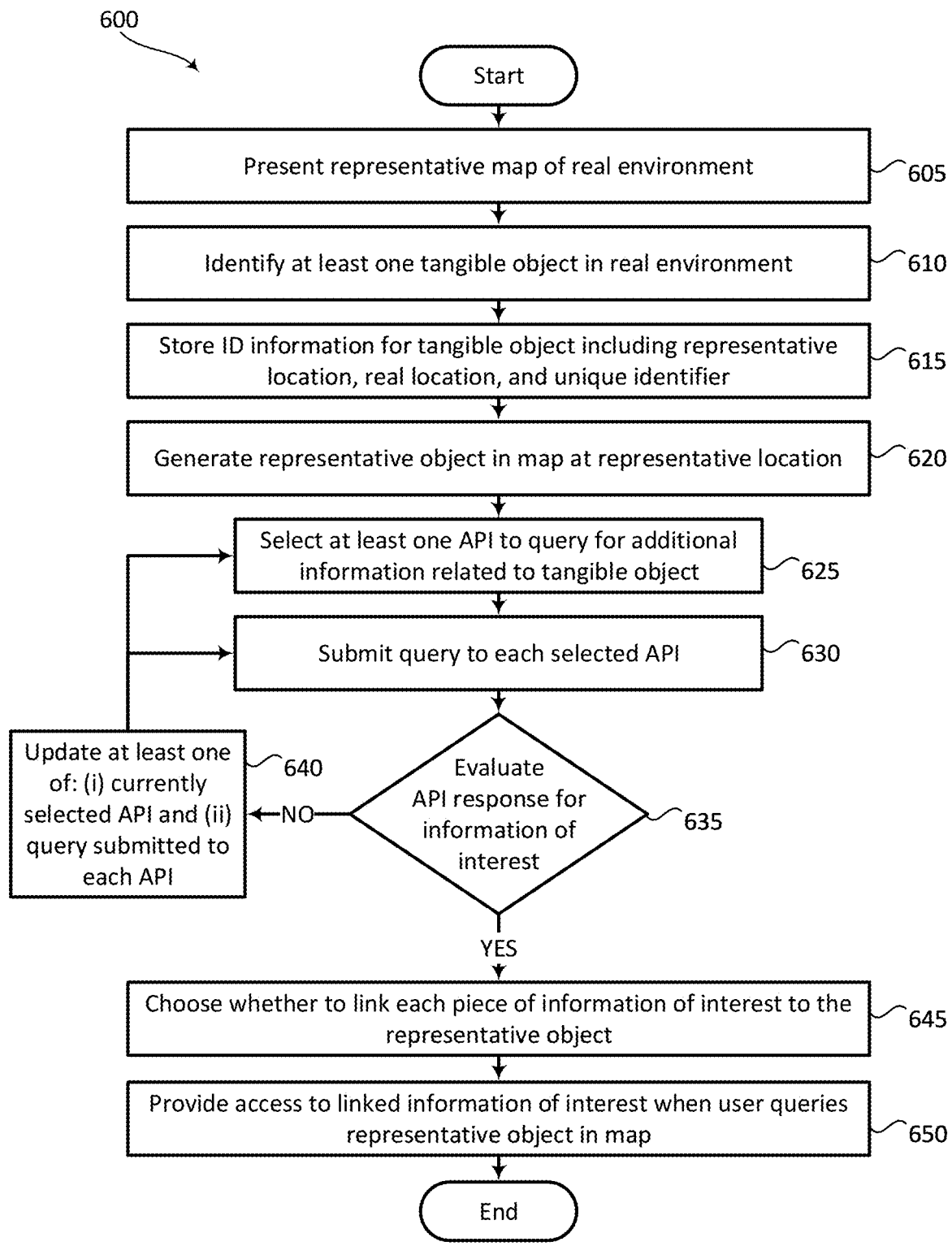
FIG. 6 depicts an exemplary method of identifying tangible objects, generating representative objects of tangible objects, and linking information of interest to the representative objects.

FIG. 6 depicts an exemplary method of identifying tangible objects, generating representative objects of tangible objects, and linking information of interest to the representative objects. For example, a system of one or more controllers may be operably connected to one or more data stores and configured to store and retrieve data therein. In some embodiments, a user device (e.g., a smartphone, tablet, laptop computer, personal computer (PC), or other device) may be provided with a set of program instructions to perform at least some of the steps herein. One or more remote computers (e.g., servers, an elastic computing network, or other appropriate devices) may be configured to perform at least some of the operations herein, and may be operably connected to the user device(s) (e.g., through a wired or wireless network, through messaging, through one or more APIs). The system may be adapted to perform operations related to identifying TOs, generating ROs related thereto, and linking information of interest to the ROs.

The method 600 begins by presenting 605 a RM of an RE to a user, and identifying 610 at least one TO in the RE. The RM may, for example, be retrieved from a data store and presented based upon a selection by a user, and may be presented upon generation of a new RM after receiving a media stream of an RE from a user. One or more TOs may be identified by a user identifying a TO in an RM, by tagging a TOs in an image, by dragging an RO representing a TO into the RM or otherwise introducing an RO or information to generate an RO therefrom, by previous identification (e.g., according to data imported from a CAD or BIM file), or by automatic recognition (e.g., by way of example and not limitation, by image analysis such as simultaneous location and mapping (SLAM) techniques, photogrammetry techniques, and Fourier transfer-based analysis; and reflective distance measuring techniques such as 3D laser scanning and ultrasonic measurement).

Identifying (ID) information is stored 615 for the TO in at least one data store, and includes a representative location, a real location, and a unique identifier. A data store may be a database in which each entry relates to a TO, and has a unique identifier automatically assigned. A representative location may be information sufficient to locate a representation of the TO in the present RM or at least one 2D or 3D RM (e.g., an absolute position or a relative position relative to a base location for the RM), or to classify the TO in at least one RM taxonomy (e.g., as illustrated in FIG. 5). A real location may be, for example, a GPS location, an absolute multi-axis coordinate, or a vector relative to a known real position. Subsequently, an RO is generated 620 using the ID information, and placed at the representative location in the RM.

In some embodiments, additional information related to the TO may be automatically sought to associate with the RO, and may be received from the user, or retrieved from one or more data stores. In the depicted illustrative example, at least one API is selected 625 to query for information of interest (IOI) related to the TO, and at least one query is submitted 630 to each selected API. Responses from the queried APIs are evaluated 635 for potential IOI. If potential IOI records are not received, the search is updated 640 by updating at least one of the selected APIs in step 625, one of the queries submitted to the APIs in 630, or both. If potential IOI records are received, the individual IOI records to link with the RO are chosen 645. Retrieved IOI may be evaluated according to, by way of example and not limitation, automatic selection such as by adaptive rules deduced by machine learning from the user's past behavior or multiple users behavior, automatic selection such as according predetermined rules retrieved from one or more data stores and implemented one or more controllers according to, for example, characteristics of the TO and RE, automatic selection such as according to predetermined user defined rules, and manual selection by a user (e.g. presentation of retrieved IOI records individually or in one or more groups, as images, icons, or in tabular format such as in a checklist). In some embodiments, as depicted in reference to method 600, a user is provided access to linked IOI records by querying the RO representing the TO in the RM. In various implementations, the IOI may be retrieved and stored in a dedicated data store or a linked data store (e.g., a user's NAS, a user's cloud storage account, appropriate data stores related to various IOI such as receipt management, home warranty service, and insurance records) either directly or through APIs, or information sufficient to retrieve the IOI (e.g., by redirecting the user, or by retrieving the IOI on-demand, such as through an API) is stored in one or more data store and associated with a unique ID of the RO.

Exemplary apparatus and methods, which may be advantageously used in various embodiments herein relating to method 600 and other example embodiments of apparatus and methods, for selecting APIs, generating and submitting queries, and evaluating responses therefrom are disclosed in U.S. patent application Ser. No. 15/912,199 filed Mar. 5, 2018, and associated US patent publication US20180196807A1, published Jul. 12, 2018, the disclosures of which relating thereto are expressly incorporated herein by reference.

Figure 7:
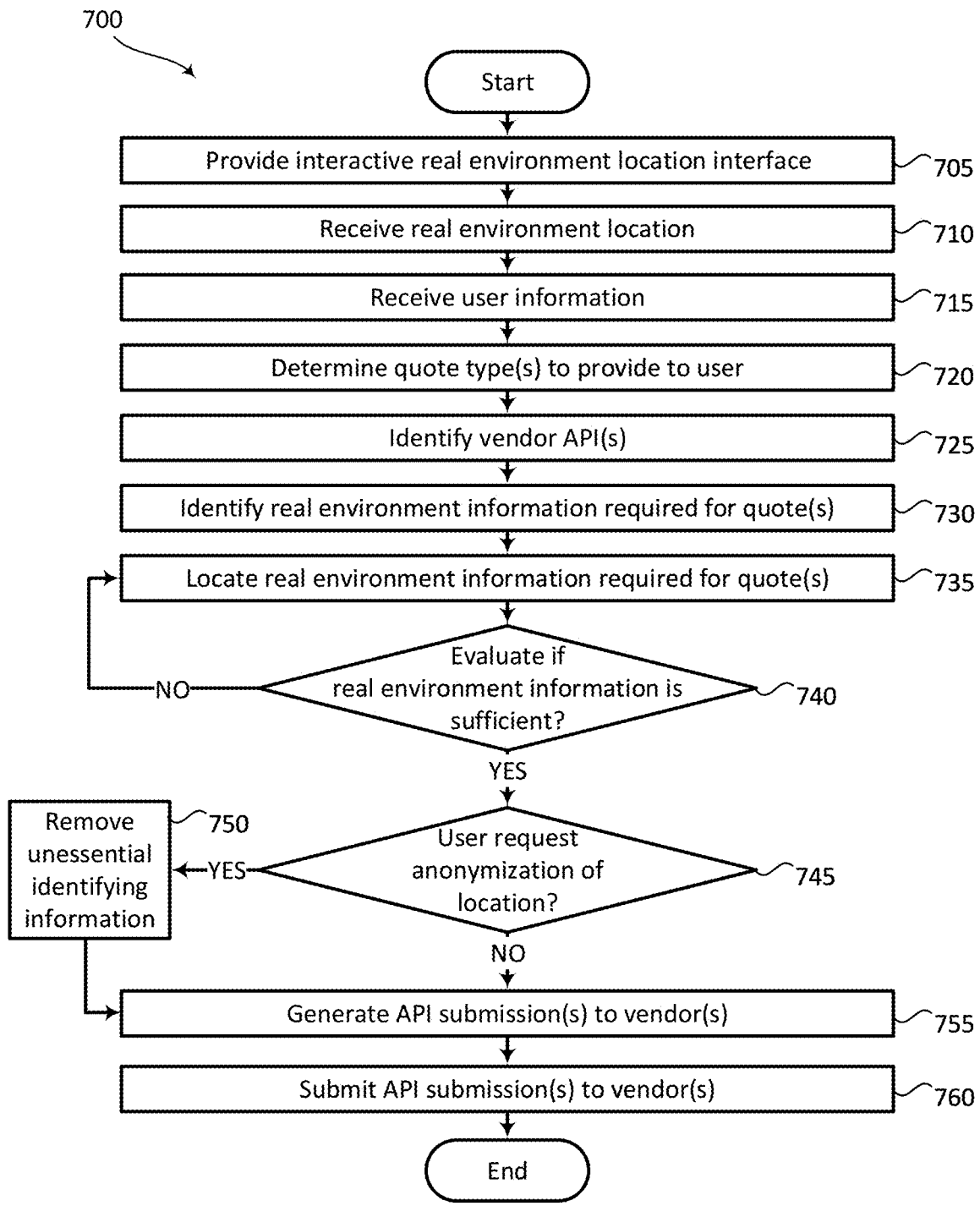
FIG. 7 depicts an exemplary method of using a representative map to generate and submit a quotation request(s) to a vendor(s) in reference to a real environment.

FIG. 7 depicts an exemplary method of using a representative map to generate and submit a quotation request(s) to a vendor(s) in reference to a real environment. For example, a system such as described herein may be adapted to perform operations related to generating and submitting one or more quotation requests to one or more vendors in reference to one or more TOs or REs. Method 700 begins by providing 705 an interactive RE location interface which may be, by way of illustration and not limitation, as shown and discussed in relation to FIGS. 1-5. The location of the RE is received 710, and may be received, for example from a user or by retrieval from a data store, such as by retrieving a location record according to a unique ID of the RE. User information is received 715, which may be received, for example, by receiving input from the user, or by retrieval from one or more data store, which may include local data stores associated with the RE or user, remote data stores, and data stores accessed through APIs (e.g., a social network profile, a financial account, a retailer or service provider account, or an insurance account). One or more vendor APIs are identified 725 to submit request(s) for quotation (RFQ(s)) to.

For example, a user may desire quotations on services (e.g., window replacement, painting, cleaning, home repair, maintenance, travel, and other services related to REs and TOs) or on products (e.g., new or replacement TOs and products related thereto such as insurance or accessories). A user may efficiently generate a RFQ, submit a RFQ, evaluate a RFQ, accept an RFQ, or some combination thereof, to one or more vendors by retrieving information from one or more data stores by interacting with RMs and ROs. Accordingly, a user may advantageously retrieve and manipulate information on multiple data stores through an intuitive interface with little or no trouble, for example, in recalling where particular information is stored—electronically or physically, what information is needed.

RE information required for the RFQ(s) is identified 730, and located 735. The RE information located is then evaluated 740 to determine if it is sufficient to generate the RFQ. The RE information may include, for example, RE location, RE attributes, TOs associated with the RE, REs within the RE, dates, documents, and values associated with the RE (e.g., current insurance documents, roof age, and plumbing type). The RE information may be identified and retrieved by querying records associated with one or more REs and ROs. Evaluating whether the information retrieved is sufficient may be, for example, by obtaining RFQ information requirements by a preliminary query to selected APIs, by retrieving predetermined lists of information from one or more data stores, and by user-defined types of information required.

Before submission, if the user has requested anonymization of their location 745, unessential identifying information is removed 750. For example, the exact location or address of the RE (e.g., a residence) may not be revealed to the vendors, only the information necessary to make a quote decision, such as zip code, or other pertinent location info, such as distance from a fire station. Subsequently, one or more API submissions are generated 755 and submitted 760 to the selected vendor(s).

Figure 8:
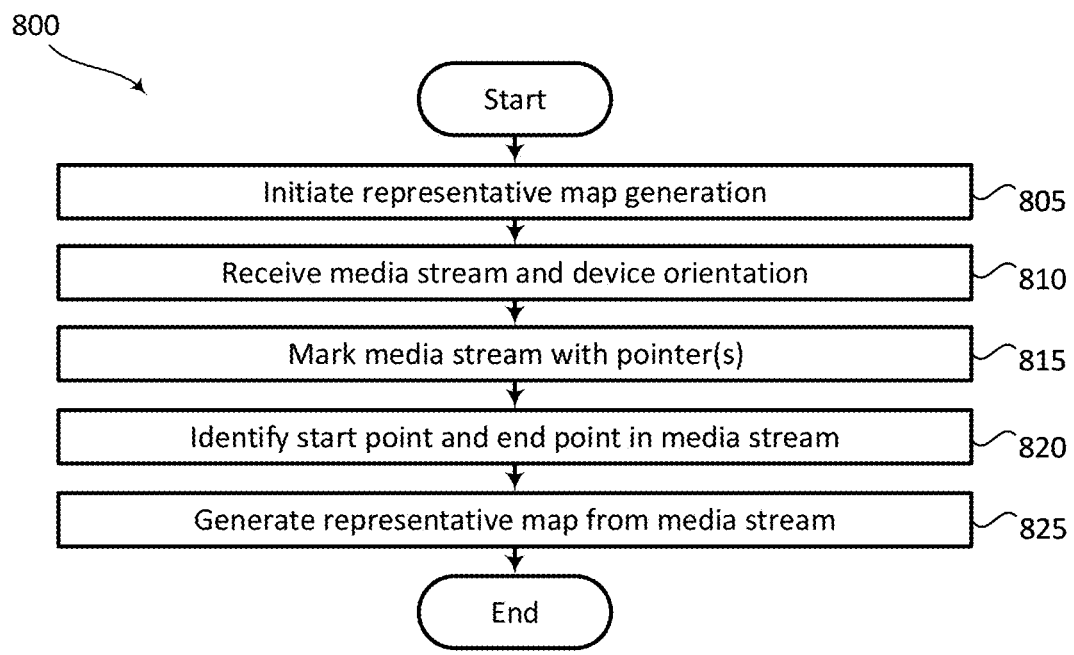
FIG. 8 depicts an exemplary method of generating a representative map of a real environment.

FIG. 8 depicts an exemplary method of generating a representative map of a real environment. For example, a system such as described herein may be adapted to perform operations related to generating an RM in relation to at least one RE. Method 800 begins by initiating 805 RM generation which may be, for example, by a user launching an app on a portable device or inputting a command to begin data capture to generate a 3D model RM. One or more controllers receive 810 a media stream from the user, including orientation data of the capture device. For example, the media stream may be from a smart phone camera, a 3D camera, virtual reality (VR) augmented glasses, and may be provided through an app on board the media capture device, or on a connected device. The media stream may also, for example, be stored and uploaded some time after capture.

The media stream images are marked 815 with one or more pointer(s) which may indicated an orientation of the image. The start point and end point of the media stream are identified 820. A RM is then generated 825 from the media stream. As discussed elsewhere herein, the RM may be, by way of illustration and not limitation, a 3D model, a 2D dollhouse view, a 2.5D view (area and height vs. true volume), or a categorized view such as in FIG. 5.

Figure 9:
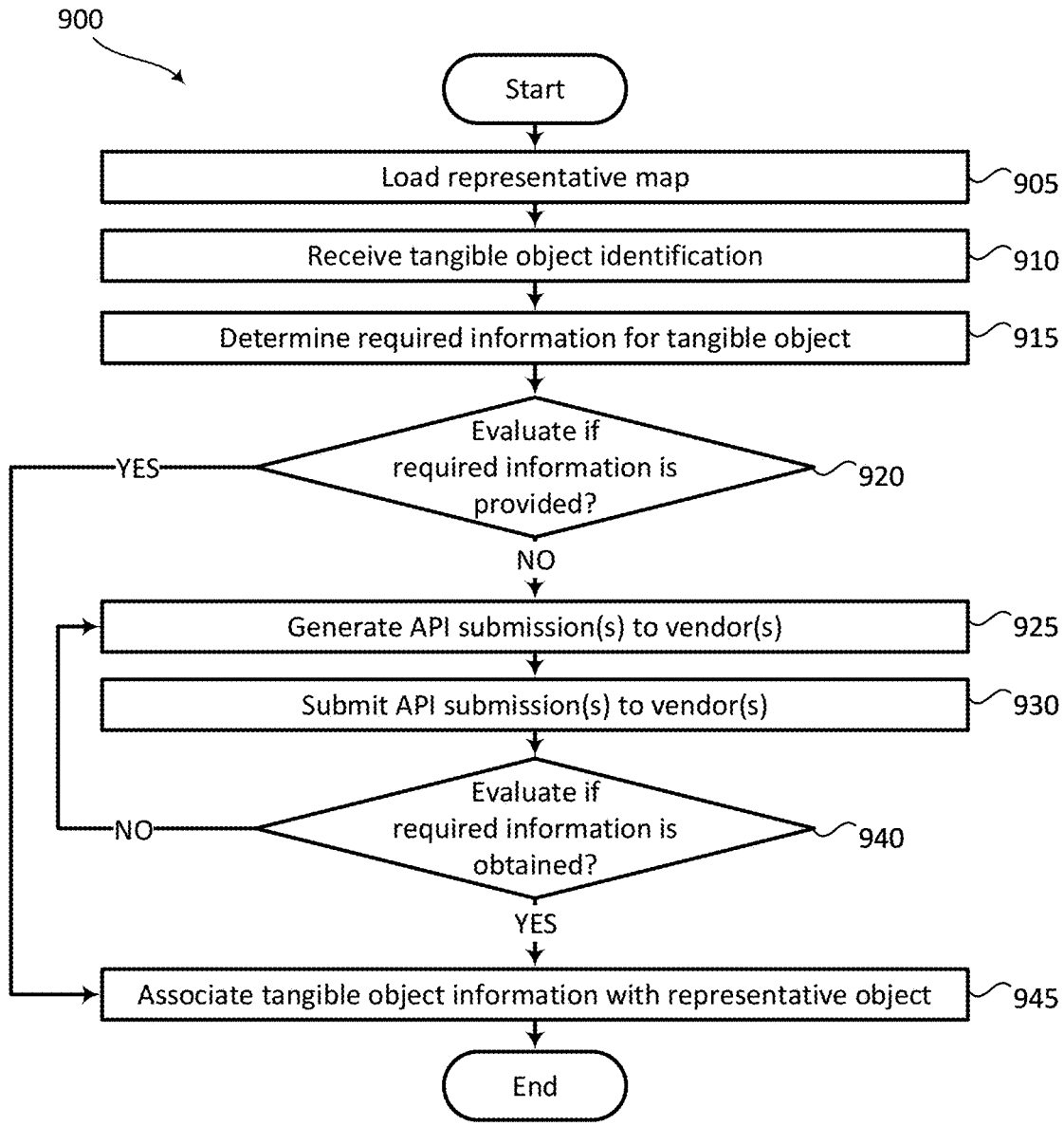
FIG. 9 depicts an exemplary method of retrieving tangible object information and linking the information with a representative object of the tangible object.

FIG. 9 depicts an exemplary method of retrieving tangible object information and linking the information with a representative object of the tangible object. For example, a system such as described herein may be adapted to perform operations related to identifying TOs in an RO and obtaining information associated therewith from one or more vendors. Method 900 begins by loading 905 a RM representing an RE, and receiving 910 identification of at least one TO which may be within the RE. The TO may be identified, for example, by a user in one or more images, may be identified by a user within a RM, may be inserted into the RM by a user (e.g., by dragging and dropping from a 'library' or 'store' of ROs or images of TOs, by upload of an image or file, or by providing a URI), and may be automatically identified (e.g., by image analysis, analysis of reflective information, analysis of geometric information, or by pattern matching from other TOs in the RE). The information required for the TO may include, for example, real location, representative location, and dimensions. The information required may include taxonomical information, which may then be used to further determine required and supplemental information. The information required for the TO may be, for example, defined by a user, loaded from a data store, or inferred from other TOs, from the RE, or both. A user may be able to load a RM, identify or add TOs or view TOs automatically identified or suggested, and quickly and efficiently retrieve information related to the TO from various data stores with minimal to no searching for information, measuring of objects, and similar difficulties and inconveniences.

Once the TO is identified and the required information determined, the information present is evaluated 920 to determine if the required information determined 915 is provided. If yes, the information related to the TO is associated with the RO in one or more appropriate data stores. If not, an API submission is generated 925 and submitted 930 to one or more vendors to obtain the missing required information. The required information may be provided in step 910, by way of example and not limitation, by automatically identifying, analyzing, classifying, or some combination thereof, the TO (e.g., by image analysis); by being provided with a file(s) containing the required information (e.g., a CAD file, an extensible markup language (XML) or comma separated value (CSV) file containing the required information, or an image file with metadata containing required information); by receiving required information from the user; or some combination thereof. Vendor(s) may be, for example, retailers, manufacturers, RO 'catalogs,' 'stores,' or 'libraries,' community provided collections, museums, repositories, or service providers. Vendors may be selected based on information provided with the TO, provided by a user, identified regarding the TO, or inferred regarding the TO, and may include taxonomical information (e.g., type of TO such as appliance, furniture, structure, window/door, building, tool, electronic, plumbing, or heating-ventilation-and-air-conditioning (HVAC)), environmental information (e.g., residential, commercial, lawn, living room, or kitchen; or TOs in the vicinity), object information (e.g., approximate size, color, or picture). For example, art retailer and repository APIs may be selected for a TO identified as art; appliance retailer, manufacturer, and collection APIs may be selected for a TO identified as an appliance; or kitchen and bath related APIs may be selected for a TO identified as being in a kitchen.

The response(s) from the API(s) are evaluated 940 to determine if required information was obtained. If not, at least one API query or vendor selection is updated in step 925, and resubmitted in step 930. If yes, the information related to the identified TO is associated 945 with the RO in at least one data store.

Figure 10:
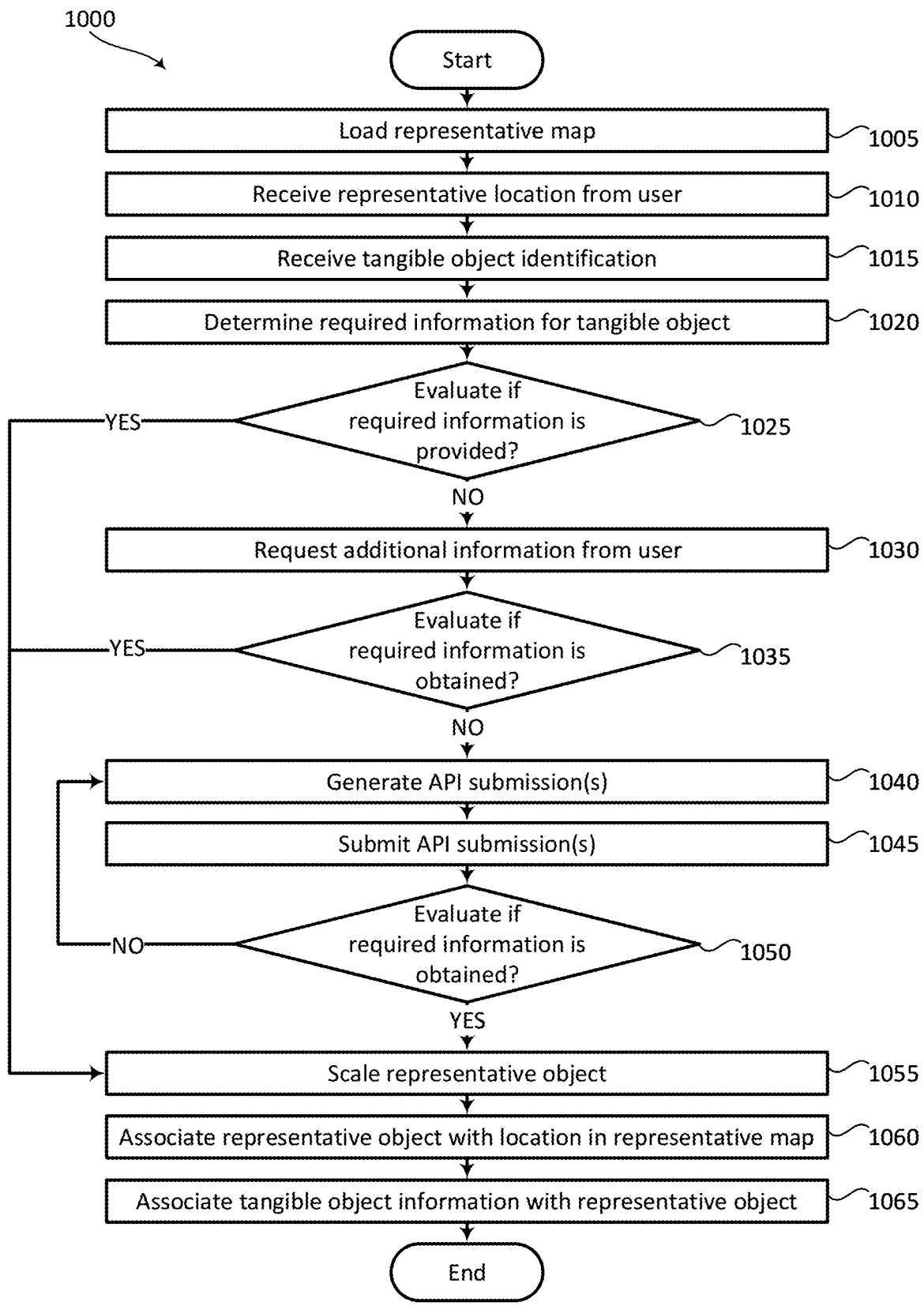
FIG. 10 depicts an exemplary method of adding a representative object of a tangible object to a representative map, and associating tangible object information with the representative object.

FIG. 10 depicts an exemplary method of adding a representative object of a tangible object to a representative map, and associating tangible object information with the representative object. For example, a system such as described herein may be adapted to perform operations related to receiving information regarding a TO from a user, generating an RO and placing it appropriately in an RM. Method 1000 begins by loading 1005 an RM and receiving 1010 a representative location from a user for an RO representing a TO placed or potentially to be placed in a correlating real location in the corresponding RE. ID of the TO is received 1015. Steps 1010 and 1015 may be, by way of example and not limitation, by a user interacting with an interface to "drag" an image of the TO into the RM in a desired location, or identifying a location in the RM (e.g. by 'clicking' in an interface, or by positioning a location-identifying device in the desired location in the RE and initiating capture of the real location by the system) and providing an image of the TO to the system. Accordingly, a user may place a TO not previously identified, or a TO desired to 'try' in the RE by visualizing or trying it in the RM, by quickly and efficiently identifying the TO, and providing required information or by allowing the system to automatically obtain required information for generating and placing an RO.

Once the TO is identified and a representative location received, the required information to for the TO in order at least to generate an RO is determined 1020, and the information present evaluated 1025 to determine if the required information is provided. Such determination of required information and evaluation may be similar, for example, as discussed in relation to FIG. 9. If the required information is provided, the method proceeds directly to generating an RO and scaling 1055 it to the proper size for placement in the RM. If the required information is not provided, the method requests 1030 additional information from the user. Such information may be, for example, taxonomical information, size information, or an image. The information, if any, provided by the user is evaluated in step 1035 to determine if the required information has been, thus, obtained. The evaluation operations may be, for example, similar to the evaluation in step 1025. If the required information has been obtained, the method proceeds to scaling step 1055.

If the required information has not been obtained, the method proceeds to attempt to obtain it through one or more APIs. At least one API is selected and at least one API submission generated 1040 and submitted 1045. API selection, generation, and submission steps may be similar, for example, to API related steps discussed elsewhere herein. Response(s) received are evaluated 1050 to determine if the required information has been obtained. Evaluation may be similar, for example, to that in steps 1025 and 1035. If the required information has not been obtained, the API submission(s) or API(s) selected, or both, are updated in step 1040 and submitted in 1045. If the required information has been obtained, the RO is generated and scaled 1055 according to, for example, the dimension of the TO, the dimensions of the RE, proportions of the RM, type of RM, or other appropriate factors.

Once the RO has been scaled 1055, the RO is associated 1060 with the representative location in the RM associated with the real location in the RE, and TO-related information (e.g., required information as well as any selected additional information) is associated with the RO in one or more data stores.

Figure 11:
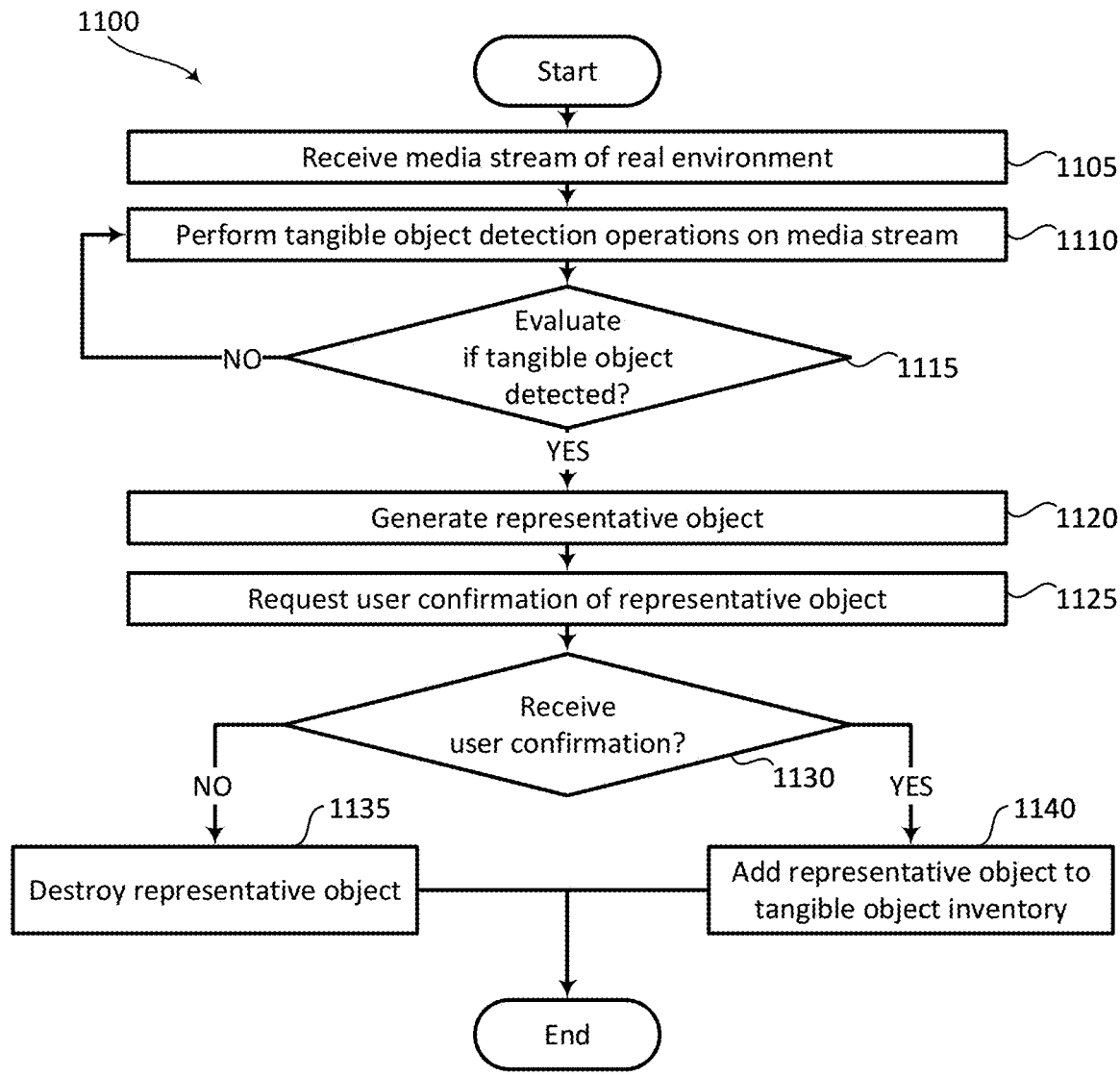
FIG. 11 depicts an exemplary method of detecting tangible objects in a real environment and generating representative objects therefor.

FIG. 11 depicts an exemplary method of detecting tangible objects in a real environment and generating representative objects therefor. For example, a system such as described herein may be adapted to perform operations related to detecting TOs in a RE. Method 1100 begins by receiving 1105 a media stream of an RE. The media stream and receiving thereof may be, for example, similar to that discussed elsewhere herein. TO detection operations are performed 1110 on the received media stream. Detection operations may be conducted, by way of illustration and not limitation, in real time as the media stream is being received, at a later point, in order in a queue, by a user's device capturing or receiving the media stream, by one or more remote controllers retrieving the media stream from one or more data stores, or some combination thereof. Detection operations may include image analysis, distance analysis, 3D model generation and analysis, SLAM techniques, edge detection techniques including Fourier transfer techniques, other appropriate techniques, or some combination thereof. Accordingly, a user may efficiently capture a media stream of an RE, and at least some TOs within the RE may be identified and an RM and ROs representing the identified TOs generated and placed in the RM. Other methods and apparatus disclosed herein may further be employed, for example, to automatically retrieve required and additional information related to the TOs.

Data produced by TO detection operations in step 1110 is evaluated 1115 to determine if any TOs were detected. If not, TO detection operations are performed 1110 (e.g., a deeper scan, ongoing analysis after preliminary analysis, or adjusting analysis parameters). If at least one TO is detected, an associated RO is generated 1120, and presented to the user and confirmation of the RO requested 1125. For example, the RO may be presented in a popup display for user confirmation, may be tentatively placed in the RM and confirmed unless removed by a user, may be presented—together with other ROs generated—to the user in a checklist format, or some combination thereof.

User response is evaluated 1130 to determine if user confirmation is received. If user confirmation is received 1140, the RO is confirmed and added to an inventory of TO. If the user does not confirm the RO, the RO is destroyed. Destruction of the RO may delete information from a data store, or may alter the status of associated records in a data store. User confirmation may, in some example systems and methods, be omitted or approval assumed unless explicit dis-confirmation is received from the user.

Figure 12:
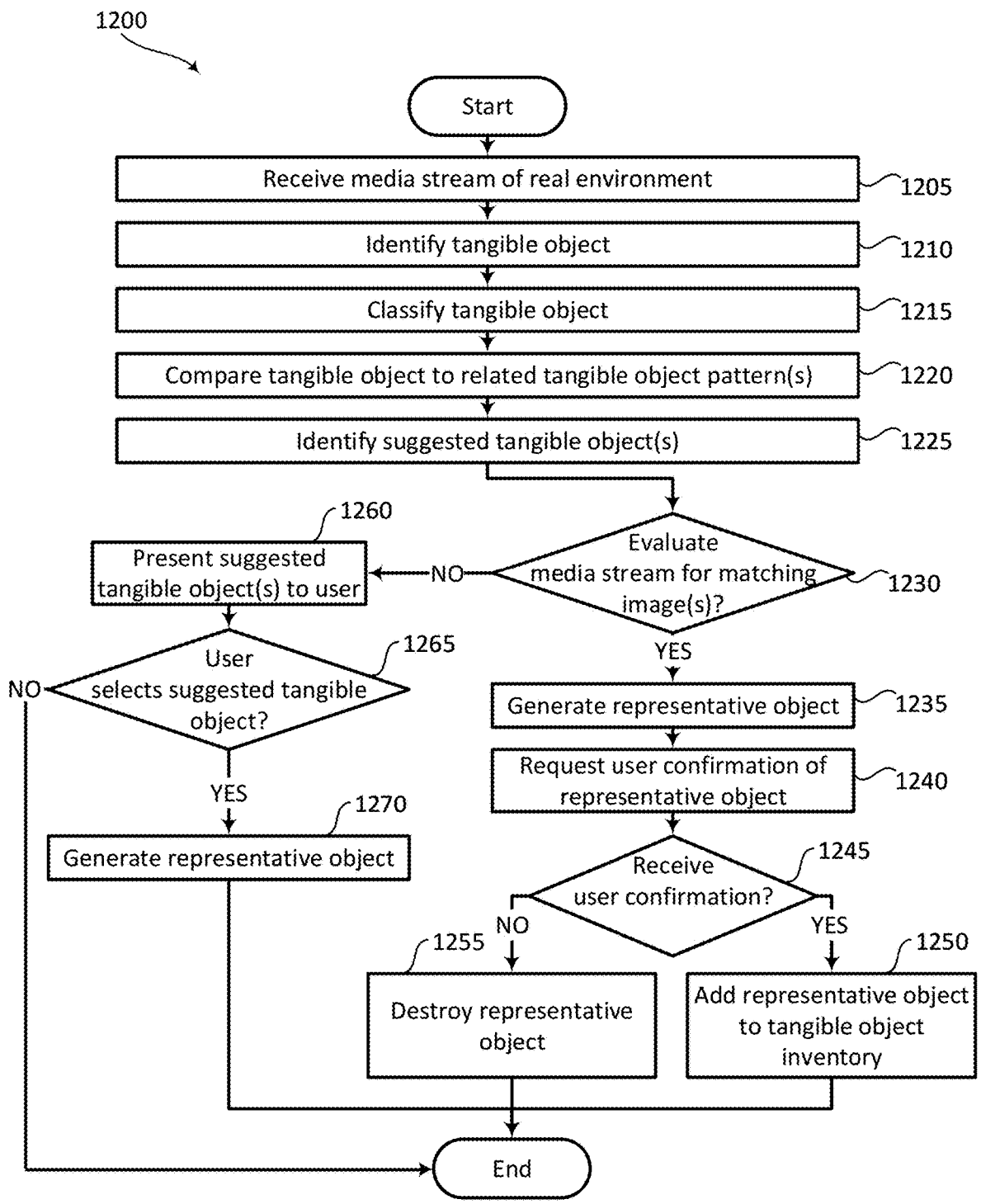
FIG. 12 depicts an exemplary method of identifying tangible objects in a real environment and generating representative objects therefor.

FIG. 12 depicts an exemplary method of identifying tangible objects in a real environment and generating representative objects therefor. For example, a system such as described herein may be adapted to perform operations related to identifying one or more TOs according to at least one TO pattern. Method 1200 begins by receiving 1205 a media stream of an RE which may be, for example, as discussed elsewhere herein. At least one TO is identified 1210, and classified 1215. Identification and classification (e.g., according to taxonomical data automatically identified, manually identified, or some combination thereof) may be as disclosed elsewhere herein. The TO is then compared 1225 to predetermined TO pattern(s), and at least one appropriate pattern selected. TO pattern(s) may, for example, be pre-saved in a data store, may be manually compiled, or may be automatically generated using historical analysis of patterns of furnishings. For example, historical analysis may determine that the presence of a dishwasher is highly correlated to the presence of a sink in the same room, or that the presence of an HVAC compressor and condensor unit outside a house is highly correlated to finding an evaporator and air handler unit inside the house. Such patterns may be manually identified, retrieved from third party data stores, or based on machine learning techniques applied to aggregated data from multiple users in relation to multiple TOs in multiple REs.

Based on the TO pattern(s) selected by comparing the TO identified to the pattern(s), suggested TOs are identified 1225 which may, for example, be present in the RE or an associated RE. The media stream is then evaluated 1230 for image(s) matching the suggest TO(s). If one or more suggested TOs are matched in the media stream, corresponding ROs are generated 1235, and user confirmation is requested 1240. Suggested TOs not found in the media stream may, for example, be ignored or presented to the user for input. If no suggested TOs are found, at least some of the suggested TOs (e.g., 'most likely' TOs, popular TOs, or all suggested TOs) are presented 1260 to the user as potential TOs that may exist in the RE. User feedback is evaluated 1265 to determine if the user selects any of the suggested TOs. If yes, an RO is generated. If the user does not, no TO is identified in the media stream.

After requesting user confirmation of automatically generated ROs in 1240, user input is evaluated 1245 to determine if the user confirms the ROs. If yes, the RO is added 1250 to TO inventory. If no, the RO is destroyed. Steps may be similar, for example, to related steps in FIG. 11.

Figure 13:
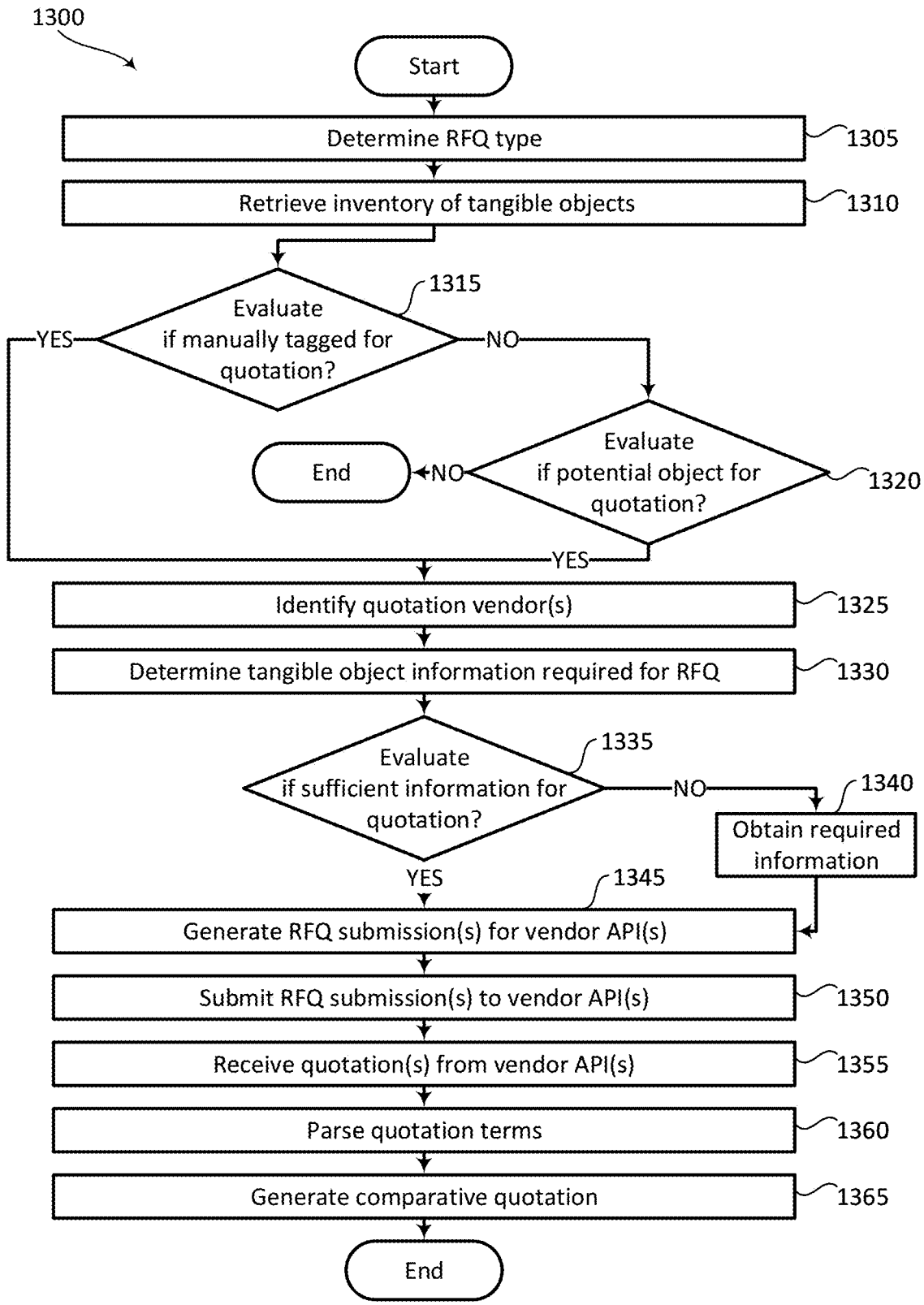
FIG. 13 depicts an exemplary method of identifying tangible objects for a quotation request(s), generating and submitting a quotation request(s), and receiving and processing a response(s) thereto.

FIG. 13 depicts an exemplary method of identifying tangible objects for a quotation request(s), generating and submitting a quotation request(s), and receiving and processing a response(s) thereto. For example, a system such as described herein may be adapted to perform operations related to generating and submitting one or more RFQs in reference to one or more TOs or REs, and comparing quotations received. Method 1300 begins by determining 1305 an RFQ type. RFQ type may, by way of illustration and not limitation, be insurance quotation request (e.g., new or updated policies, homeowners insurance, farm and ranch insurance, insurance policy riders, special property riders), repair or maintenance request (e.g., plumbing repair, seasonal HVAC maintenance, or roof repair), purchase request (e.g., new or replacement appliances, structures such as doors or windows, or fixtures such as lights or plumbing fixtures), service request (e.g., TO valuation request, interior design request, architectural request, building request, tax preparation request). Accordingly, operations may be performed which allow a user to easily and efficiently generate, submit, and compare RFQs associated with one or more TOs or REs, with minimal to no location and copying of information, finding contact information, formatting RFQs, or tedious comparison of differently formatted RFQs.

Once the RFQ type is determined, an inventory of TOs held by the user is retrieved 1310. In some embodiments, REs may be identified and evaluated. The inventory may be retrieved from one or more data stores of ROs representing the various TOs. The retrieved inventory of TOs (represented by ROs) is evaluated 1315 to determine if any ROs were previously manually tagged for the current quotation type. If not tagged, the RO is evaluated 1320 to determine if the untagged RO is potentially applicable to the quotation type. If not, no TO is identified for the quotation. If a TO is evaluated 1315 as being tagged for the current quotation type, or is evaluated 1320 as potentially applicable to the quotation type, one or more vendors are identified 1325 to submit RFQs to. For example, ROs may be previously manually or automatically tagged as potentially insurable, or may be automatically detected as being potentially insurable (e.g., by comparing to known insurable items). Quotation vendor(s) may be identified, according to the quotation type. Quotation vendor(s) may additionally be identified, for example, according to various TO or RE characteristics and may be identified or selected as disclosed elsewhere herein.

The information related to the TO required to generate an RFQ is determined 1330. Required information may be determined, for example, as disclosed elsewhere herein. The presently available information, which may, for example, be retrieved from one or more data stores (e.g., from an internal or local data store, from a remote data store, or through an API(s)), is evaluated 1335 to determine if sufficient information is available for the RFQ. What information is sufficient may, for example, be obtained by a preliminary query to identified vendor(s), or by retrieving a predetermined list of typically sufficient information from a data store. If the information present is not sufficient, it is obtained 1340. The required information may be obtained, for example, by requesting it from the user, by retrieving it from a data store(s), by requesting it through an API(s), or some combination thereof.

Once sufficient information has been obtained, or if the information present is determined to be sufficient, at least one RFQ submission is generated 1345 for at least one vendor API. The RFQ submission(s) are submitted 1350 to the selected vendor API(s), and one or more quotation(s) are received 1355 in response. The terms (referring to the terms of the offer vs strictly as an abbreviation of 'terminology') of the quotation received are parsed 1360 and a comparative quotation is generated 1365. Parsing may be, for example, by natural language processing (NLP), by searching predetermined key words (e.g., retrieved from a data store according to the quotation type), or by preformatted quotation(s) according to one or more predetermined quotation standards. A comparative quotation may be, for example, in a chart form comparing common terms offered (e.g., insurance coverage amount, premium amount, standard exclusions, quote amount, time frame for a service quote, power requirements of an appliance, or standard characteristics of a TO being quoted). The comparative quotation may present common key terms in 'user-friendly' terminology, and may include one or more sections highlighting uncommon or non-standard terms included. The actual quotations may be appended to the comparative quotation. The quotation may be attached to the ROs or RMs associated with the TOs or REs related to the quotation.

Figure 14:
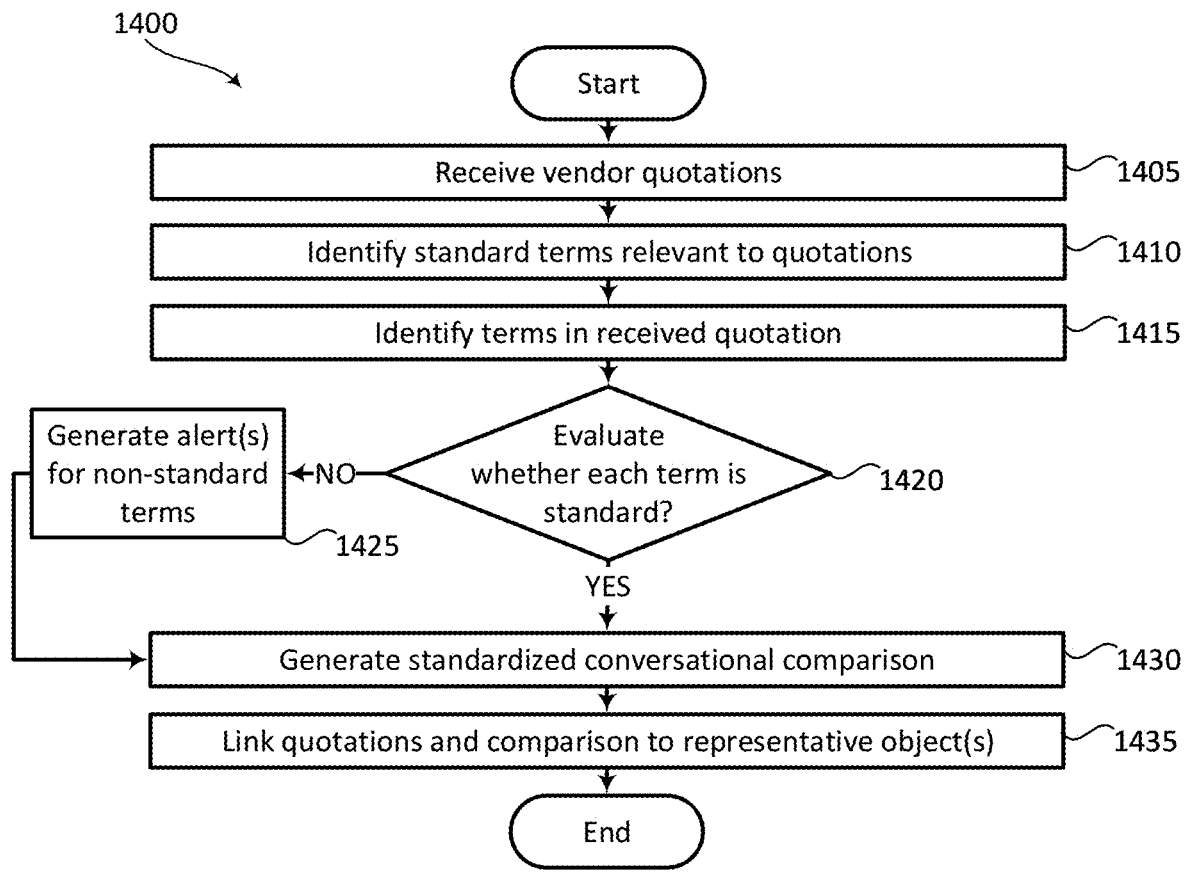
FIG. 14 depicts an exemplary method of comparing vendor quotation(s).

FIG. 14 depicts an exemplary method of comparing vendor quotation(s). For example, a system such as described herein may be adapted to perform operations related to comparing terms of quotations. Method 1400 begins by receiving 1405 one or more vendor quotations. In some embodiments, at least two vendor quotations are received 1045. Predetermined standard terms relevant to the quotations are identified 1410, and the particular terms in the quotations received are identified 1415. Accordingly, operations may be advantageously performed which compare vendor quotations to predetermined standard terms and present to the user a conversational comparison of the quotations so that the user may efficiently, quickly, and easily compare the quotations without difficulty associated with different formats, different terminology, different sections included and omitted, and potentially limited user knowledge of standard terms.

Standard terms may be predetermined, for example, by subject matter experts (e.g., insurance lawyers or insurance agents for insurance quotations, and contract lawyers or various builders or agents for building and remodeling quotations), by standards organizations (e.g., builders' association, insurance association, International Standards Organization (ISO), board of realtors, bar association, or governmental bodies), by machine learning techniques applied to historical quotations, by NLP techniques, or some combination thereof. Predetermined standard terms may be retrieved from one or more data stores: some may be preloaded on a user's device, some may be provided in associated cloud storage, and some may be available from third-party repositories. Terms in a contract may be identified, for example, by NLP, by a quotation being provided in a standard format, by terminal searching, or some combination thereof.

Each identified term in the contract is then evaluated 1420 to determine if it matches to a predetermined standard term. If not, an alert is generated 1425 for each non-standard term. The alert(s) may be provided, for example, as notations in a comparative quotation, by popups, by notations on vendor quotations, or some combination thereof. If each term is standard, or once an alert(s) has been generated for a non-standard term(s), a standardized conversational comparison quote is generated 1430. The conversational comparison quote may be dynamically generated, such as by NLP, or may be generated according to predetermined terminology, explanations, or both associated with the predetermined standard terms and retrieved from a data store(s) associated therewith. The various actual vendor quotation(s) and the conversational comparative quotation are attached 1435 to the appropriate ROs representing TOs related to the quotations. The quotations may be attached to appropriate RMs representing REs related to the quotations.

Figure 15:
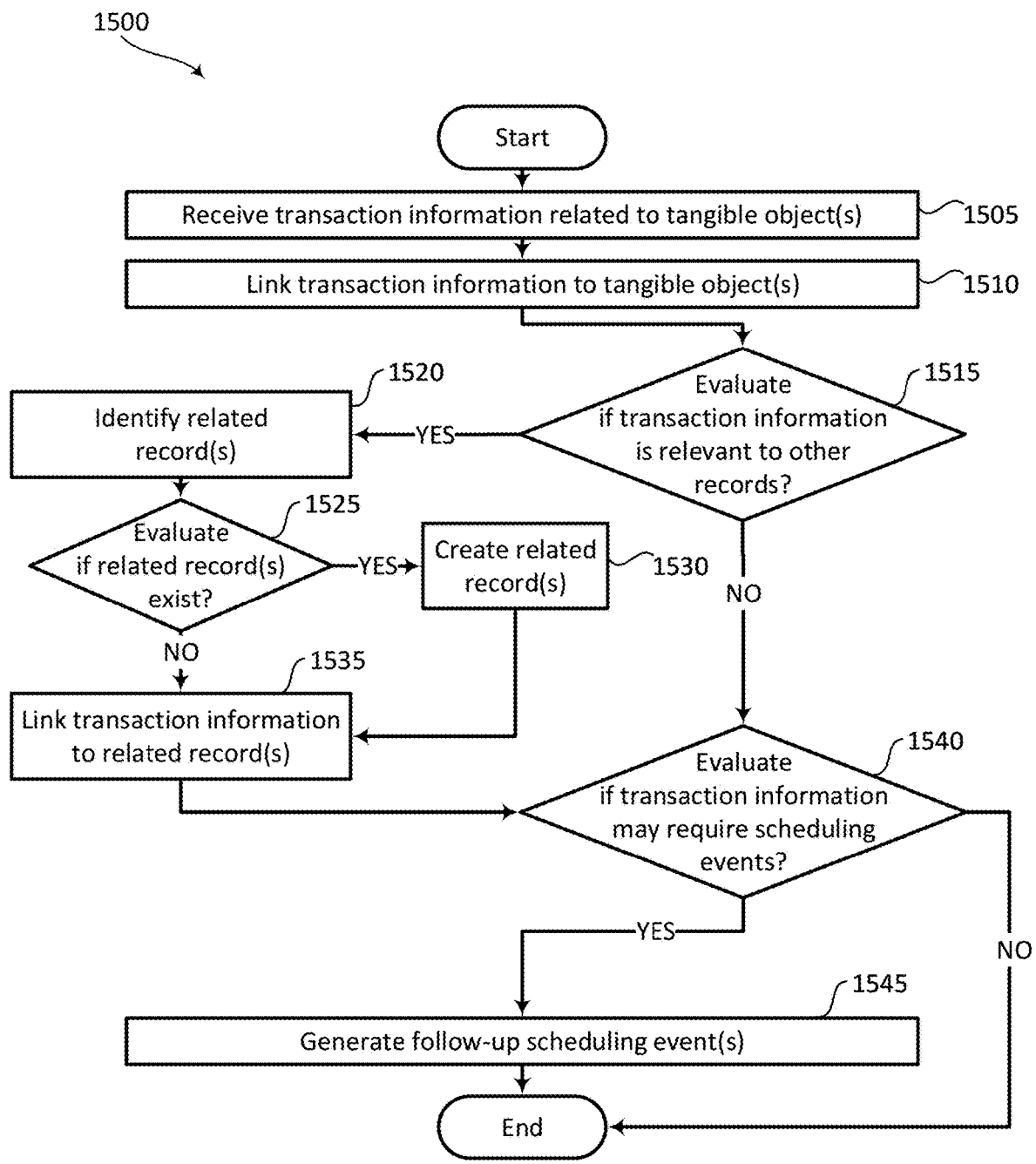
FIG. 15 depicts an exemplary method of linking transaction information to a representative object(s).

FIG. 15 depicts an exemplary method of linking transaction information to a representative object(s). For example, a system such as described herein may be adapted to perform operations related to processing transaction information related to one or more TOs. Method 1500 begins by receiving 1505 transaction information (TI) related to one or more TO. The received TI is then linked 1510 to the related TO(s). For example, the TI may be a receipt, an invoice, a warranty document, a financial transaction, a bill of sale, or other transaction-related document. The TI may be manually provided by the user, or may be retrieved automatically from one or more data stores (e.g., financial records, email, saved receipts, or vendor records) and may be received, for example, by upload, direct file sharing, messaging, or APIs. Linking the TI may, for example, include saving a document or other information to a data store, linked to the RO(s) by unique IDs, or may include saving information sufficient to retrieve the document from a third-party data store or redirect the user thereto.

The TI is evaluated 1515 for relevance to one or more other related records or potential records. If it is relevant, the related TO records (linked to ROs) are identified 1520. The records are evaluated 1525 for existence. If they do not exist, the related record(s) are created 1530. Once the related records are created, of if they already exist, the TI is linked 1535 to the related record(s). Related records may be related, for example to one or more ROs representing associated TOs, to one or more RMs representing associated REs, to one or more users, or some combination thereof. Related records may be, for example, tax returns (e.g., related because a transaction is a tax-deductible purchase), insurance inventory (e.g., a new purchase may be insurable or affect current insurance policies), or employer reimbursement records (e.g., a home office expense reimbursable by an employer).

If the TI is not relevant to other records or potential records, or once the TI has been linked to related record(s), the TI is evaluated 1540 for potentially requiring one or more scheduling events. If so, follow-up scheduling events are generated 1545, if not the method is completed. Scheduling events may include, for example, an ordering schedule for consumable items (e.g., printer ink, or water filtration cartridges), a maintenance schedule (e.g., seasonal maintenance of HVAC units, winterization of a pool and associated equipment, spring tune-up of lawn equipment, or periodic pest control). Scheduling events may, for example, be stored in a data store and presented in a calendar format, may be sent as messages to the user or other entities or systems, and may be submitted through one or more APIs (e.g., to a third-party calendar system, to a retailer for automatic re-ordering, to a service provider for automatic scheduling). Scheduling events may be, for example, processed as external (e.g., submitted for management to one or more external entities or systems), or internal (e.g., managed internally, such as generating purchase requests automatically, or notifying a user for approval or to initiate suggested operations).

Although various embodiments have been described with reference to the figures, other embodiments are possible. For example, in some embodiments, a user may download an app on a portable device, create a user profile, include associated financial information for payments, and indicate which types of quotes are desired (e.g., insurance, repairs, or servicing). The user may choose an "anonymize" option which causes the exact location or address of the house (an RE) to not revealed to the vendors, and instead only the information vendors need to make a quote decision, such as zip code, or other pertinent location info, such as distance from a fire station. For example, a 9 digit zip may be identified by the app from the user inputted address. The app may then initiate operations to determine which type of information is necessary for any particular quote. If insurance, for example, operations may be performed which would automatically measure distance to fire hydrants, or to a nearest fire station.

For example, when a user inputs the address, the latitude and longitude of that address may be retrieved using a maps API, and a marker placed on a map. Operations may be performed which identify all items within the radius of the location that might be relevant to a given function, such as a function of procuring insurance quotes. For example, these items might include fire hydrant locations, fire station locations, which may be obtained, for example, from a proprietary database or publicly accessible APIs. These items may then be marked with latitude and longitude, and a mapping system API used to search between the user address and various items, and the distances recorded in a data store related to the RE. Additionally, information may be retrieved from proprietary databases for information regarding events such as fires within these designated areas. This information may then be formatted according to a proprietary system and sent to vendors (e.g., insurers).

In some embodiments, a user may modify an RM by dragging items (such as ROs, or representing information from which an RO may be initially generated) into the RM from other sources which are then embedded into the RM. For example, an image and text correlating to information in an original source (e.g., an external data store) may be 'drug' into the RM. For example, the source of the items dragged into the map may include:

- an associated app, such as My Fav Art, where an item dragged into the RM causes an RO to be automatically generated according to information retrieved from the app, and the RO to be scaled according to dimensions obtained from the app according to dimensionality of the RM. For example, a user may 'try' art from a My Fav Art gallery in a RE by placing an associated RO in a corresponding RM, without having to physically borrow the actual art from the gallery.
- an unrelated online store
- an online ad distributed by third party sources When the image is moved into the digital map, it may be automatically resized to fit in proportion to the dimensions of the RM. In some embodiments, not just the image is 'dragged' into the RM, but the information associated therewith. This may be accomplished, for example, by manually dragging and dropping each info item. In some embodiments 4 exact data pieces are used to identify an object and retrieve all other related information. If those 4 bits are embedded or otherwise associated with an image, then all other related information associated therewith in the original source may be retrieved therefrom through an API as necessary.

In various embodiments, identifying information associated with an item moved into an RM may vary. For example, a refrigerator may include some combination of: a copy of a warranty, notes about when the unit was serviced and is next due for servicing, copies of any receipts, user-generated notes about the manufacturer, a picture(s) of the refrigerator, and related items as part of a system. For example, an air conditioning system may include all air conditioning units outside the home, showing linkages to thermostats, air coil(s), and related wiring, as well as contact information for servicing, and contact information for the manufacturer. In the case of an art object within the home available on My Fav Art, for example, associated information may include a My Fav Art ID, art name, image URI, and dimensions.

For example, in the case of an art object, the information that may be automatically moved and associated with in image moved into an RM might include:
Name
Artist Name
Category
Picture of Art
Description of Object
Culture Background/Genre
Dimensions
Seller City/Purchased Location
Location Art was created
Technique and Materials
Artist Background
Upload Documents In some embodiments, a user may, for example, place markers to tag the items in a 3D model-based RM. When a user clicks anywhere in the 3D model, the location of the click may be calculated in pixels; for example, calculating the X, Y and Z axis as values that represent how far the clicked point is from a center or starting point. If additional information may be required, when a user places a pointer, they may be presented with a popup with a form in it for information not already in a related database. In some embodiments, a user can input name and description, attach files, add links, add tags and categorize ROs. This information may be stored in a database, and files uploaded to a cloud server.

In some embodiments, for example, in a left panel of a RM display, a list of items available from other sources may be displayed for a user to drag and drop into the model. When an item is dropped into the model (RM), an API request(s) may be generated and sent to get a list of items with the images, names and IDs (e.g., of art to My Fav Art). The result from this API call may be received in JavaScript Object Notation (JSON) format. The system may process the JSON data and display a list of matching items at the left side of the 3D Model. Additional information may be fetched using REST API calls even after an RO is added to the model.

For example, when a user drags an items and drops it on the RM, the location where it is dropped may be stored as a representative location, and may be used as a unique ID for the RO. The user may be allowed to give the RO a name, color, attach files, or move it within the RM. Users may be able to add as many files as they want to a single RO. All added files may be, for example, uploaded to a cloud server and saved them in a database using the unique ID.

In some embodiments, an app may contain program instructions to initiate operations to identify items (ROs) that may be insurable in an RM. For example, items that are dragged into the RM may be automatically identified as insurance candidates. For example, real-time object detection may be conducted on every frame of a media stream received from a user related to an RE. TOs may be identified, and associated ROs generated and stored in a database with an ID for each of them connected to that RM. TOs may be identified, for example, by using historical analysis of patterns of furnishings.

In some embodiments, a list of insurable items may be created by identifying, based on aggregated data from other users, TOs found on many users' lists. Such TOs may include heating units, dishwashers, HVAC, microwave, oven, toilets, sinks, or air filters. TOs may by automatically identified based on image matching to suggest items to be added to an inventory. TOs may be manually tagged by a user as, for example, insurable. The RM may then be compared by a user to a list of potentially insurable items, and to historical data of items identified by other users as insurable. A suggested checklist of items to include in the RM may be generated, and a user prompted to uncheck any item that should not to be included. From this process an "inventory" may be created and stored a data store associated with the RM for that user.

Based on the process above, and historical experience with the insurance process and other users, the user may be prompted for additional information about checked items to create a complete list of information to provide to potential insurers or other vendors. This batch of information may then be automatically reformatted to meet proprietary needs of processing systems of each insurer (or other vendor), so that the information can be automatically processed according to each vendor's particular system. The vendor than processes the information according to its own propriety system, and decides, for example:
  if it needs additional information, in which case the request may be sent to the user
  if it has sufficient information to either offer to refuse to offer insurance, and, if so, may notify the user
  if the insurer has sufficient info and is willing to offer insurance, in which case a quote and terms are returned.

The responses may then be analyzed and formatted in such a way that they are directly comparable between each other. Any questions the insurance companies had may be identified, for example, by identifying ROs representing the questioned TOs within the RM and, if possible, the questions may be automatically answered. Automatically answering may be possible for example in some embodiments employing a standardized hierarchy of information for each type of function which does not currently exist. For example, for all users, the warranty information for an appliance may be in the same place within the database to make automated searching easier.

Once the comparison is generated and questions answered where possible, the user may be alerted to terms in the insurance company quotes which are unusual. Such identification of unusual terms may possible in some embodiments, for example, through a proprietary system identifying standard terms for each type of function, such as insurance, comparing the bids from any vendor against the standard terms sheet, and identifying differences, both in clauses and values.

The quotes may then be ordered as a recommendation for the user. This may, for example, perform a function unable or infeasible for a human because of the time-consuming and labor-intensive nature of comparing quotes from different vendors without a database of standardized terms and figures to compare those numbers and terms to, then reformat the quotations in comparable formats, convert the legal language of the quotes to conversational English, and identifying terms that are not standard.

For example, in relation to homeowners insurance, key variables may include:
  Total price, which may be the amount that the homeowner pays, including any applicable taxes Length of term (actual dates the policy applies, and an indicator of length, such as "6 months" or "annual")

What the policy covers, e.g., "All items inside your home at 11520 Summit Ridge Court"

What the policy doesn't cover, e.g., "Except the car in the garage, jewelry worth over $10,000", and "any items not on the inventory list" ("inventory list" may, for example, be a clickable link to the list), or "any damage from hurricanes"

Contact information: for example, name, phone number, and email address of the person a user should contact with further questions Most frequent problems or comments from users in relation to this particular vendor and this particular type of policy For example, in relation to framing an art object, criteria may include:

Total price, including tax and delivery

Delivery date

Image of what the finished, framed TO will look like within the RE, based on placing an RO in the RM Framer comments on any risks, such as breakage of the object during transportation, or chance of later delivery Final size of the framed TO; for the frame dimensions may be added to the original dimensions for the RO to display to a user a representation of the framed object in the RM, giving the user an opportunity to see how it fits within the RE prior to framing being completed The user may then respond to the bid(s) accordingly. A record of all responses and correspondence may be retained, and stored in one or more data stores and linked to the appropriate RMs and ROs. For example, if there is a special rider to an insurance policy regarding a specific valuable piece of art, the RM may identify that rider when the user selects the RO representing that art. The responses may, for example, be stored in a database and referenced by a unique ID of the RO.

Responses from vendors and other transactions may be analyzed, stored, and linked, and a notification list generated or updated and presented to the user for items which require the user's attention, such as designated cleaning or servicing intervals. For example, email or SMS messaging notifications may be sent to a user to check these pending items. For example, when a user's 3D view pointer in an RM is near to an RO with a pending task, that RO may be highlighted in the 3D map and pending actions displayed.

In some embodiments, an RE or portion thereof may be re-scanned by a user, and media stream generated compared to the previous media stream to detect changes therein. Changes may be automatically updated or presented to a user for approval.

In some embodiments, a user may link financial information and permissions, such as to a checking account or credit card account, and payment operations may be automatically performed (such as for approved bids or maintenance operations), all associated payment information stored and linked to the associated ROs and RMs. In some embodiments, based on the user profile, aggregated info from other users, and other information, a transaction may be evaluated for relevance other records kept by the user, and processed accordingly. For example, when a new RO is added to an RM, a series of questions may be presented to the user, and information received in response associated with the ROs and RM, and with associated documents. Such documents may include, by way of example and not limitation, inventory records, moving records, tax returns, and reimbursement documents. For example, if a printer is detected, such as by image recognition or transaction analysis:

the user may be requested to confirm that the new TO is a printer the printer may be categorized or tagged based on the tags the user may have added, or by information associated with the RM (e.g., identification of the RM in which the printer is added as a home office) and confirmed by the user type of printer and its cost may be deduced based on the image that the user moved into the digital house, based on transaction records, or by image analysis from a re-scan the type and cost of the printer is not indicated clearly from the image, the user may be prompted to answer a series of predetermined questions from a database suggesting what type of printer it might be and asking the user to choose one if the user has allowed access to a draft tax return, the cost of the printer and the receipt for the purchase may be added to the user's draft tax return with a notation indicating the date and other relevant information if the user has set up additional documents, such as a reimbursement form from their employer for home office expenses, the printer and expense and date may be added to that form the printer may be added to an inventory for insurance purposes the printer may be added to an inventory for moving purposes printer ink may be added to a suggested automated shopping list or calendar, based, for example on date of purchase, type of printer, and past printer ink ordering schedule In various embodiments, each time an additional item is added to the RM, it may be automatically detected and an RO added to the corresponding RM, and the user prompted for additional information that might be relevant to future quotes.

In some embodiments, for example, if a homeowners insurance policy has an annual renewal, a user may be notified of upcoming payments, and the policy information may be updated based on new items added or removed since the last quote, and the vendor(s) may be informed of changes to the house. In some embodiments, a list of vendors chosen by the user based on ROs in the RM(s) is maintained, and may include contact information for the vendors, plans, pricing, and terms & conditions. If the user choose, for example, an insurance quote may be automatically rebid and updated at each time of renewal.

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments may be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits). In some embodiments, the processor and the memory can be supplemented by, or incorporated in hardware programmable devices, such as FPGAs, for example.

As described herein, the data store may generally include one or more data storage devices that tangibly contain at least a portion of the executable instructions that may be executed on one or more processors to perform the operations described herein.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from a source to a receiver over a dedicated physical link (e.g., fiber optic link, infrared link, ultrasonic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, FireWire, ATA/IDE, RS-232, RS-422, RS-485, 802.11 a/b/g/n, Wi-Fi, WiFi-Direct, Li-Fi, Bluetooth, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

In various embodiments, a computer system may include non-transitory memory. The memory may be connected to the one or more processors, which may be configured for storing data and computer readable instructions, including processor executable program instructions. The data and computer readable instructions may be accessible to the one or more processors. The processor executable program instructions, when executed by the one or more processors, may cause the one or more processors to perform various operations.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

CONCLUSION

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. In some examples, various steps of operations may be optional or not required. In various implementations, various components or process steps may be combined or integrated with one another. Accordingly, other implementations are contemplated.

The invention claimed has been herein disclosed sufficiently for persons skilled in the art to comprehend and practice. The various embodiments, examples, and illustrations disclosed herein, while representing modes of carrying out the invention as currently contemplated by the inventors, including the best mode currently contemplated, are by no means limiting or exhaustive, but serve as an aid to comprehending the full nature and scope of the invention. Various other embodiments may become apparent which fall within the scope of this disclosure and claims.

What is claimed is:

1. A system comprising:
a data store comprising a program of instructions; and,
a processor operably coupled to the data store such that, when the processor executes the program of instructions, the processor causes operations to be performed to generate at least one quotation request from records related to tangible property and stored across multiple data stores, the operations comprising:
in response to a user interacting with a user interface to select a representative object, the user interface displaying a virtual environment comprising a visual indicium of the representative object in the virtual environment, then retrieve, by the processor, the representative object from a first datastore, wherein the representative object comprises a predetermined data structure corresponding to a tangible object in a real environment, and wherein the virtual environment comprises an interactive map of the real environment;
determining, by the processor, attributes of the tangible object based on the representative object, the attributes comprising classification and historical events associated with the tangible object, wherein the historical events comprise a historical action performed with respect to the tangible object;
selecting, by the processor and based on the attributes, a plurality of application programming interfaces (APIs), each API corresponding to at least one action capable of being performed in relation to the tangible object, wherein selecting the plurality of APIs comprises selecting attributes for the tangible object by adaptive rules generated by a machine learning model from at least one user's historical behavior;
determining, by the processor and based on the plurality of APIs, a plurality of actions to associate with the representative object, and associating the actions;
generating and transmitting, by the processor and to the user interface, a signal configured to cause the user interface to generate an action display comprising at least one interactive visual indicium for each of the plurality of actions, wherein each interactive visual indicium is associated with at least one action of the plurality of actions and a corresponding at least one API of the plurality of APIs such that, the plurality of APIs are accessible through the user interface such that when the user selects the visual indicium, the corresponding at least one action is initiated for the corresponding at least one API as a function of at least some of the attributes, including the classification and the historical action, and associated with the representative object and the tangible object;
determine a required information set corresponding to the tangible object by the corresponding at least one API;
retrieve, based on the representative object, a first set of information corresponding to the tangible object;
determine if the first set of information satisfies the required information set;
upon determining that the first set of information does not satisfy the required information set, identify at least one supplementary API based on the attributes, and retrieve, via the at least one supplementary API, a second set of information; and,
upon determining that at least one of the first set of information and the second set of information satisfy the required information set, then continue the at least one action with the at least one API.

2. The system of claim 1, wherein the visual indicium of the representative object comprises a multi-dimensional image of the object, and wherein the user interacting with the visual indicium corresponds to the user selecting the visual indicium.

3. The system of claim 1, wherein the action display is displayed in visual association with the representative object.

4. The system of claim 1, wherein the at least one action comprises retrieving documentation related to the tangible object.

5. The system of claim 1, wherein the at least one action comprises requesting a quotation related to the tangible object.

6. The system of claim 1, wherein the at least one action comprises locating at least one supplemental tangible object based on the attributes of the tangible object.

7. The system of claim 1, further comprising the user interface.

8. A computer program product embodied on at least one non-transitory computer readable medium comprising:
a program of instructions tangibly embodied on the at least one non-transitory computer readable medium, wherein when the instructions are executed on at least one processor, the at least one processor causes operations to be performed to generate at least one quotation request from records related to tangible property and stored across multiple data stores, the operations comprising:
in response to a user interacting with a user interface to select a representative object, the user interface displaying a virtual environment comprising a visual indicium of the representative object in the virtual environment, then retrieve, by the at least one processor, the representative object from a first datastore, wherein the representative object comprises a predetermined data structure corresponding to a tangible object in a real environment, and wherein the virtual environment comprises an interactive map of the real environment;
determining, by the at least one processor, attributes of the tangible object based on the representative object, the attributes comprising classification and historical events associated with the tangible object, wherein the historical events comprise a historical action performed with respect to the tangible object;
selecting, by the at least one processor and based on the attributes, a plurality of application programming interfaces (APIs), each API corresponding to at least one action capable of being performed in relation to the tangible object, wherein selecting the plurality of APIs comprises selecting attributes for the tangible object by adaptive rules generated by a machine learning model from at least one user's historical behavior;
determining, by the at least one processor and based on the plurality of APIs, a plurality of actions to associate with the representative object, and associating the actions;
generating and transmitting, by the at least one processor and to the user interface, a signal configured to cause the user interface to generate an action display comprising at least one interactive visual indicium for each of the plurality of actions, wherein each interactive visual indicium is associated with at least one action of the plurality of actions and a corresponding at least one API of the plurality of APIs, such that the plurality of APIs are accessible through the user interface such that, when the user selects the visual indicium, the corresponding at least one action is initiated for the corresponding at least one API as a function of at least some of the attributes, including the classification and the historical action, and associated with the representative object and the tangible object;

determine a required information set corresponding to the tangible object by the corresponding at least one API;

retrieve, based on the representative object, a first set of information corresponding to the tangible object;

determine if the first set of information satisfies the required information set;

upon determining that the first set of information does not satisfy the required information set, identify at least one supplementary API based on the attributes, and retrieve, via the at least one supplementary API, a second set of information; and upon determining that at least one of the first set of information and the second set of information satisfy the required information set, then continue the at least one action with the at least one API.

9. The computer program product of claim 8, wherein the visual indicium of the representative object comprises a multi-dimensional image of the object, and wherein the user interacting with the visual indicium corresponds to the user selecting the visual indicium.

10. The computer program product of claim 8, wherein the action display is displayed in visual association with the representative object.

11. The computer program product of claim 8, wherein the at least one action comprises retrieving documentation related to the tangible object.

12. The computer program product of claim 8, wherein the at least one action comprises requesting a quotation related to the tangible object.

13. The computer program product of claim 8, wherein the at least one action comprises locating at least one supplemental tangible object based on the attributes of the tangible object.

14. A computer-implemented method performed by at least one processor to generate at least one quotation request from records related to tangible property and stored across multiple data stores, the method comprising:

in response to a user interacting with a user interface to select a representative object, the user interface displaying a virtual environment comprising a visual indicium of the representative object in the virtual environment, then retrieve the representative object from a first datastore, wherein the representative object comprises a predetermined data structure corresponding to a tangible object in a real environment, and wherein the virtual environment comprises an interactive map of the real environment;

determining attributes of the tangible object based on the representative object, the attributes comprising classification and historical events associated with the tangible object, wherein the historical events comprise a historical action performed with respect to the tangible object;

selecting, based on the attributes, a plurality of application programming interfaces (APIs), each API corresponding to at least one action capable of being performed in relation to the tangible object, wherein selecting the plurality of APIs comprises selecting attributes for the tangible object by adaptive rules generated by a machine learning model from at least one user's historical behavior;

determining, based on the plurality of APIs, a plurality of actions to associate with the representative object, and associating the actions;

generating and transmitting, to the user interface, a signal configured to cause the user interface to generate an action display comprising at least one interactive visual indicium for each of the plurality of actions, wherein each interactive visual indicium is associated with at least one action of the plurality of actions and a corresponding at least one API of the plurality of APIs, such that the plurality of APIs are accessible through the user interface such that, when the user selects the visual indicium, the corresponding at least one action is initiated for the corresponding at least one API as a function of at least some of the attributes, including the classification and the historical action, and associated with the representative object and the tangible object;

determine a required information set corresponding to the tangible object by the corresponding at least one API;

retrieve, based on the representative object, a first set of information corresponding to the tangible object;

determine if the first set of information satisfies the required information set;

upon determining that the first set of information does not satisfy the required information set, identify at least one supplementary API based on the attributes, and retrieve, via the at least one supplementary API, a second set of information; and, upon determining that at least one of the first set of information and the second set of information satisfy the required information set, then continue the at least one action with the at least one API.

15. The method of claim 14, wherein the action display is displayed in visual association with the representative object.

16. The method of claim 14, wherein the real environment comprises real estate, and the tangible object comprises a specific physical object physically located within the real environment.

17. The method of claim 14, wherein the historical event comprises an action performed to the tangible object.

18. The method of claim 14, wherein the historical event comprises one or more of: a physical installation of the tangible object, a physical maintenance action to the tangible object; a physical alteration of the tangible object; a transaction respecting the tangible object; a registration of the tangible object; a service request for the tangible object; a quotation respecting the tangible object; a valuation of the tangible object; a document recordation associated with the tangible object; and some combination thereof.

* * * * *